United States Patent [19]

Baba et al.

[11] 4,410,370

[45] Oct. 18, 1983

[54] AIRCRAFT STRINGER MATERIAL AND METHOD FOR PRODUCING THE SAME

[75] Inventors: Yoshio Baba; Teruo Uno; Hideo Yoshida, all of Nagoya, Japan

[73] Assignee: Sumitomo Light Metal Industries, Ltd., Tokyo, Japan

[21] Appl. No.: 173,529

[22] Filed: Jul. 30, 1980

[30] Foreign Application Priority Data

| Sep. 29, 1979 | [JP] | Japan | 54-125989 |
| Dec. 14, 1979 | [JP] | Japan | 54-163193 |
| Dec. 21, 1979 | [JP] | Japan | 54-165696 |
| Jun. 27, 1980 | [JP] | Japan | 55-87592 |
| Jun. 27, 1980 | [JP] | Japan | 55-87593 |

[51] Int. Cl.³ .................................................. C22F 1/04
[52] U.S. Cl. ........................... 148/11.5 A; 148/11.5 Q; 148/12.7 A; 148/417; 148/439
[58] Field of Search ............... 148/12.7 A, 11.5 A, 148/11.5 Q, 2, 32, 32.5

[56] References Cited

U.S. PATENT DOCUMENTS 4,305,763 12/1981 Quist et al. .................. 148/12.7 A Primary Examiner—R. Dean
Attorney, Agent, or Firm—Flynn, Thiel, Boutell & Tanis

[57] ABSTRACT

An aircraft stringer material having high strength, small grain size, good resistance to stress corrosion cracking and a very high degree of workability is produced from an aluminum base alloy consisting essentially of 5.1 to 8.1 wt. % Zn, 1.8 to 3.4 wt. % Mg, 1.2 to 2.6 wt. % Cu, up to 0.20 wt. % Ti and at least one of 0.18 to 0.35 wt. % Cr and 0.05 to 0.25 wt. % Zr, the balance being aluminum and impurities, by a production method characterized by a special annealing step including rapid heating to a temperature of 320° to 500° C. at a heating rate exceeding 11° C./min.

Further, a corrosion-resistant stringer material is produced in a manner very similar to the above production method, using the above aluminum alloy as a core and AA7072 alloy as cladding.

20 Claims, 8 Drawing Figures

AIRCRAFT STRINGER MATERIAL AND METHOD FOR PRODUCING THE SAME

BACKGROUND OF THE INVENTION

This invention relates to an aircraft stringer material and a method for producing the same.

Conventionally, AA7075 alloy is well known as a typical raw material for an aircraft stringer and had wide-spread use in the aircraft field. Generally, the alloy is fabricated into the aircraft stringer by the following process.

The AA7075 alloy ingot is homogenized by heating at about 460° C. for 16 to 24 hours and hot rolled at 400° C. to provide a plate approximately 4 to 8 mm thick. This plate is then intermediate annealed at around 410° C. for 1 hour, cooled at a cooling rate not exceeding 30° C./hr. and cold rolled to a plate of 2 to 4 mm in thickness. The cold rolled plate is annealed by heating to a temperature of 410° C. for 8–12 hours and holding the temperature for about one to two hours. Further, the annealed plate is cooled to a temperature of approximately 230° C. at a cooling rate of 30° C./hr. or less, maintained at the temperature for 6 hours and air cooled to produce the primary stringer material.

Further the primary stringer material is subjected to a stepped cold working at various cold reductions ranging from 0 to 90%, and subsequently to a solution heat treatment, providing the secondary stringer material. The solution heat treatment may also be carried out without the stepped cold working.

Generally, the aforesaid primary material is known as O-material, while the secondary material as W-material. Thus, hereinafter the former is referred to as "O-material" and the latter to as "W-material". W-material is formed into the desired shape, such as a hat-shape, Z-shape or J-shape, by section roll forming and the treated W-material is subjected to a T6 temper treatment and, if required, further chemical milling to provide the aircraft stringer and stringer frame.

However, the conventional stringer materials have, for example, the following disadvantages:

The O-material produced from AA7075 alloy according to the above conventional method has a large grain size of 150–250 μm and if the O-material is subjected to cold working with a relatively small amount of cold reduction, such as cold reduction of 10–30%, and then to the solution heat treatment, its grain size further grows, resulting in the reduction of mechanical properties and presenting many serious problems in the subsequent processes. Particularly, cold reduction of 20% is known to cause the marked grain growth.

Such considerable grain growth in the parts which are cold worked with a small amount of cold reduction causes reduction of elongation and fracture toughness, and leads to an undesirable orange peel appearance and occurrence of cracks during section roll forming. Further, when material having a large grain size exceeding 100 μm is subjected to a conventional chemical milling, which is practiced in the production of the aircraft stringer, the surface roughness increases remarkably and the fatigue strength is lowered. Hence, in case of the small amount of cold reduction, the production of the stringer is not only very difficult, but also the properties of the product are not satisfactory. In case a relatively large amount of cold reduction of more than 50% is followed by the solution heat treatment, it is possible to make the grain size approximately 50 μm in the material. However, in practice, cold rolling reduction of a wide range of 0 to 90% is conducted on one piece of O-material of about 10 m in length so that it is extremely difficult to achieve a grain size not exceeding 100 μm over the entire length.

Therefore, an O-material which can develop a fine grain size not exceeding 100 μm in the W-material over the above wide range of cold reduction has been requested.

Still further, stringer materials prepared from a conventional Al-Zn-Mg-Cu alloy, such as AA7075 alloy, are generally inferior in corrosion-resistance, and thus highly improved corrosion-resistance is desired.

SUMMARY OF THE INVENTION

The primary object of the present invention is to provide an improved unclad or clad material useful for an aircraft stringer or stringer frame and a method for producing the same wherein the above-mentioned disadvantages encountered in the conventional practice are eliminated.

Another object of the present invention is to provide the light aircraft stringer or stringer frame having highly improved mechanical properties and corrosion-resistance.

According to the present invention, because the grain growth in O-material occurring during the solution treatment after cold working is very slight, even in the case of a relatively small amount of cold reduction such as approximately 30% reduction or less, the stringer and the stringer frame material (hereinafter, the stringer and stringer material mean stringer and stringer frame, and stringer and stringer frame materials respectively, unless otherwise stated.) having grain sizes of 100 μm and less over their entire length can be readily obtained after solution heat treatment. This imparts a high degree of workability strength and fracture toughness to the stringer material.

The unclad O- and W-materials contemplated by the present invention are 100 μm and less in grain size and are made of an aluminum base alloy consisting essentially of 5.1 to 8.1 wt.% Zn, 1.8 to 3.4 wt.% Mg, 1.2 to 2.6 wt.% Cu, up to 0.20 wt.% Ti and at least one of 0.18 to 0.35 wt.% Cr and 0.05 to 0.25 wt.% Zr, the balance being aluminum and incidental impurities.

In order to produce the O-material, the above aluminum base alloy is homogenized, hot rolled and cold rolled to a given thickness as in the conventional method. The cold rolled alloy is then annealed by rapid heating to a temperature of 320° to 500° C. at a heating rate of more than 11° C./min. and then cooled. In this annealing step, if the succeeding cooling is performed at a cooling rate of 30° C./hour and upward, the material may be further heated to 200° to 500° C. and cooled at the following cooling rate. In the case of a reheating temperature of 200° to less than 350° C., the cooling is performed at a cooling rate of 30° C./hour and less, or by air-cooling, and in the case of a reheating temperature of 350° to 500° C., it is done at a rate not exceeding 30° C./hour. Such reheating procedure is particularly effective to make O-material highly workable.

The thus obtained O-material can receive a stepped cold working to a 0 to 90% cold reduction in thickness without degradation of mechanical properties and a W-material having a fine grain size not exceeding 100 μm can be obtained from this O-material after solution heat treatment.

According to the present invention, a clad stringer material further having excellent corrosion-resistance in addition to the above advantages can be also prepared in a process similar to the above described process using the above specified aluminum base alloy as a core material and AA7072 alloy as a cladding material. In the clad O- and W-material, the grain sizes of the cores do not exceed 100 μm throughout the cores. AA7072 alloy has a high corrosion-resistance and serves to prevent the core alloy material from corrosion, resulting in an aircraft stringer having a remarkably improved corrosion-resistance. In order to produce the clad material, AA7072 alloy is clad onto the one or both sides of the above aluminum alloy core layer in the manner described hereinafter at the hot rolling step and the production proceeds as with unclad material described above to provide clad O-materials and further W-materials. The thus resulting materials, O- and W-materials, have an extremely high degree of corrosion-resistance, since the cladding layer of 7072 alloy serves as a protective layer and prevents corrosion of the core layer.

The above unclad and clad materials can also receive a normal chemical milling without reduction of fatigue strength.

The above and further objects, features and advantages of the present invention will be more apparent from the following description and the accompanying drawings.

DETAILED DESCRIPTION

Figure 1:
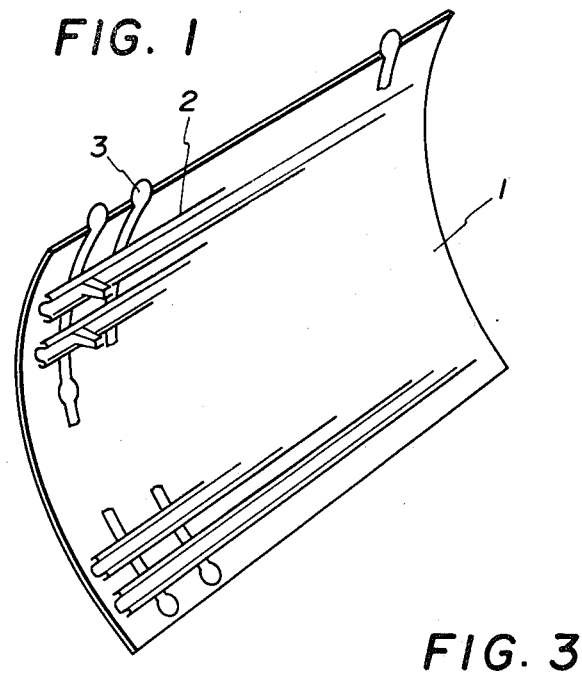
FIG. 1 is a partial perspective view of the inside of an aircraft body.

In practicing the present invention, the composition limit of the aluminum base alloy described in the preceding paragraphs must be closely followed in order to achieve the objects contemplated by the invention. The reason for the limitation of each component of the alloy according to the present invention is as follows:

Zn: When its content is less than 5.1 wt.%, the strength of the material (hereinafter referred to as "T6-material") after the T6 type heat treatment does not reach the required level. On the other hand, when the content exceeds 8.1 wt.%, fracture resistance of the T6-material decreases and stress corrosion cracking is apt to occur.

Mg: If the content is less than 1.8 wt.%, the strength of the T6-material after the T6 type heat treatment is low, and, if the content exceeds 3.4 wt.%, cold-workability of the annealed material does not reach the required level. Further the fracture resistance of the T6-material decreases.

Cu: A content of less than 1.2 wt.% lowers the strength of the T6-material and a content of more than 2.6 wt.% lowers the fracture resistance of the T6-material.

Ti: The addition of 0.2 wt.% or less of Ti is effective to prevent the cracking of ingot during grain refinement of cast structures. However, the addition of more than 0.20 wt.% leads to formation of giant intermetallic compounds.

Cr: A content of less than 0.18 wt.% causes stress corrosion cracking. On the other hand, a content of more than 0.35 wt.% leads to formation of giant intermetallic compounds and fracture resistance of the T6-material.

Zr: The addition of between 0.05 and 0.25 wt.% serves effectively to prevent stress corrosion cracking and to refine the grain size. If the content is less than 0.05 wt.%, the above effect is insufficient and if it exceeds 0.25 wt.%, giant intermetallic compounds are formed. Formation of giant intermetallic compounds should be avoided. As incidental impurities, Fe, Si and Mn must be restricted as follows:

Fe: This component has an effect on the grain refinement, but if its content exceeds 0.50 wt.%, the amount of insoluble compounds increases in the alloy, lowering the fracture resistance of the T6-material.

Si: This component exhibits an effect on grain refinement. A content of more than 0.40 wt.% increases the amount of insoluble compounds in the alloy, leading to lowering of the fracture resistance of the T6-material.

Mn: This imparts high resistance to stress corrosion cracks to the material. If its content exceeds 0.70 wt.%, sufficient quench sensitivity and fracture toughness can not be attained.

In order to prepare unclad aircraft stringer materials, such as unclad O-material and W-material, using the aluminum alloy according to the present invention, the alloy ingot is homogenized at a temperature of 400° to 490° C. for 2 to 48 hours so that the main additional elements like Zn, Mg and Cu may fully dissolve and, at the same time, Cr and Zr may precipitate as a fine intermetallic compound. If homogenization is insufficient, due to an inadequate heating temperature or insufficient heating time, hot-workability of the aluminum base alloy ingot and resistance to stress corrosion cracks will decrease and, further, grain growth will occur. On the other hand, when the heating temperature for the homogenizing treatment exceeds 490° C., eutectic melting occurs. Hence, the heating temperature for homogenizing is preferably limited to a temperature not exceeding 490° C.

Hot rolling after the homogenizing treatment is preferably initiated from a starting temperature of 350° to 470° C. A starting temperature of less than 350° C. makes the deformation resistance of the material high and hot rolling is very difficult, while a starting temperature of more than 470° C. reduces the hot-workability of the alloy. Thus, it is preferable to set the initial temperature within the above range.

Following the above hot rolling, an annealing treatment may, if desired, be performed. This treatment is performed by holding the hot rolled material at a temperature of 300° to 460° C. and then cooling it to a temperature of approximately 260° C. at a cooling rate not exceeding 30° C./hr. This annealing step is particularly needed when the degree of the cold rolling reduction in the subsequent cold working is high.

The cold rolling reduction in the cold rolling operation is preferably 20% or more, since, when the rolling reduction is low, the grain size of the resultant stringer O-material and W-material grows to more than 100 μm.

Cold rolled material is further subjected to annealed characterized by rapid heating to a temperature of from 320° C. to 500° C. at a heating rate of more than 11° C./min., and this process is especially useful in producing a high quality and coil-formed stringer material.

Conventional annealing of an aluminum base alloy, such as the AA 7075 alloy, has been accomplished by heating to a temperature of 413° to 454° C., holding this temperature for two hours, air cooling, reheating to a temperature of 232° C., holding this temperature for six hours and finally cooling to room temperature. This annealing procedure is proposed in MIL Spec. H6088E. item 5.2.7.2 and has been well known as the most normal annealing method for the 7075 alloy in the aircraft field. Thus, the above annealing process according to the present invention will be found to exceed the above common knowledge.

If the heating temperature exceeds 500° C., the material melts and marked grain growth occurs. On the other hand, when the heating temperature is below 320° C., annealing and recrystallization of the material are insufficient. In producing the aircraft stringer, since such phenomenon causes cracks on the stepped cold working or taper rolling work, such phenomenon should be avoided. It was found that only the above range of heating temperatures, 320° to 500° C., enables the production of a stringer material having fine grain sizes not exceeding 100 μm.

With regard to a heating rate to achieve the above high temperature, 320° C. to 500° C., when rapidly heating at a heating rate of more than 11° C./min., precipitation of Mg-Zn type compounds is very slight and dislocation structure introduced by the cold rolling will be changed to a uniformly fine cell structure by the above annealing treatment including the rapid heating step. When the thus obtained O-material is subjected to the stepped cold working or the taper rolling work with a comparatively small rolling reduction (10 to 30%) and then to the solution heat treatment, such cell structure serves as a nucleation site of recrystallization and develops a uniformly fine recrystallized grain structure. On the other hand, if, in the annealing process, the heating rate is 11° C./min. or less, Mg-Zn type compounds precipitate unevenly during heating to a given annealing temperature, and the dislocation structure formed during the preceding cold rolling step will disappear completely or remain a coarse and nonuniform cell structure. If the thus annealed material receives the cold working with the above comparatively small reduction and then the solution heat treatment, the recrystallized grain becomes coarse so that a uniform and fine recrystallized grain structure can not be obtained.

Referring to a cooling rate after the above rapid heating, a cooling rate below 30° C./hour can achieve a complete O-material and impart a high degree of cold workability. Thus such cooling makes possible a taper rolling reduction of wide range, up to 90% at a time.

On the other hand, if the cooling rate is 30° C./hour or more, the material is hardened, that is, age-hardened, and so an O-material having a higher strength relative to that of usual O-material is obtained. Thus, such rapid cooling does not matter when the O-materials are to be used to stringer materials which are cold worked to a comparatively small amount of cold reduction. However, the rapid cooling is undesirable for O-materials materials which are to be subjected to a large amount of cold reduction. For this, further study was conducted and the following thermal treatment was found to overcome the above problem.

In practicing the annealing, when the cooling rate is 30° C./hr. or more, the annealing process is performed by a two-stage thermal treatment. The first stage of thermal treatment is performed by rapidly heating the cold rolled material to 320° to 500° C. at the rate exceeding 11° C./min., as described above, and cooling at a rate of 30° C./hour or more. Following the first stage of thermal treatment, the material is subjected to the second stage of thermal treatment.

The second stage of thermal treatment is performed by reheating to a temperature within the range of 200° to 500° C. and subsequently cooling at a rate depending on the reheating temperature. When the reheating temperature range is 200° C. to less than 350° C., cooling is achieved at a cooling rate not exceeding 30° C./hour or air cooling. On the other hand, when the reheating temperature range is between 350° C. and 500° C., the cooling rate is 30° C./hr. and less. In case the reheating temperature of the second stage of heat treatment is the above comparatively low temperature of from 200° to less than 350° C., air cooling or cooling at the rate not exceeding 30° C./hr. is applicable so that the material may not again age-harden, whereas, in case of a comparatively high reheating temperature between 350° and 500° C., the cooling rate is 30° C./hr. and less. By adding the above reheating step to the first rapid heating step, high workability can be attained, even if the cooling rate after the first rapid heating is 30° C./hr. or more.

By using the above composition and process, unclad O-material having a very high degree of workability can be readily obtained and unclad W-material in which the grain size does not exceed 100 μm over the entire length can be prepared from this unclad O-material after the solution heat treatment, regardless of the degree of cold reduction of the stepped cold working. Grain size not exceeding 100 μm eliminates orange peels and cracks during section roll forming and make possible an improved stringer having superior mechanical properties, such as elongation, fracture roughness and excellent chemical milling capability.

In a further embodiment of the present invention, the clad aircraft stringer materials are made of the core material of the above aluminum base alloy consisting essentially of 5.1 to 8.1 wt.% Zn, 1.8 to 3.4 wt.% Mg, 1.2 to 2.6 wt.% Cu, up to 0.20 wt.% Ti and at least one of 0.18 to 0.35 wt.% Cr and 0.05 to 0.025 wt.% Zr, the balance being aluminum and impurities, and the cladding material of AA7072 alloy is made in a way similar to that described for the unclad material.

The cladding raw material of AA7072 alloy ingot is preferably homogenized at a temperature of 400° to 560° C. for 2 to 48 hours so that major alloying elements such as Zn may sufficiently dissolve in the alloy to provide a uniform solid solution and thereafter the treated ingot is rolled to a desired thickness.

Prior to cladding, the cladding material and the core material which has been homogenized in the same manner as in the case of unclad materials are degreased. The degreased cladding material is bonded to at least one side of the degreased core material by welding and hot rolling. A preferable clad rate is 0.05 to 10% per one side of the core.

A clad rate below 0.05% renders hot clad-rolling difficult and the cladding layer is liable to be damaged. Further, satisfactory corrosion-resistance cannot be achieved. On the other hand, a clad rate exceeding 10% is liable to lower the strength of the clad composite material after heat treatment and presents a problem.

Following the above hot clad-rolling, the clad composite is cold rolled, annealed and further stepped cold worked in the same way as with the unclad material to provide the clad O-material and W-material in which the grain sizes of cores do not exceed 100 μm. The thus produced clad stringer materials attain a highly improved corrosion-resistance as well as the advantages described for the unclad stringer materials.

Figure 2:
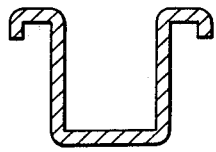
FIGS. 2, 3 and 4 are sectional views which exemplify the shapes of aircraft stringers.
Figure 3:
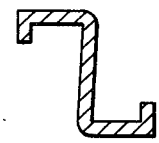
Figure 4:
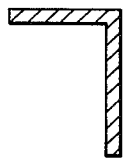

Aircraft stringers are for reinforcement and, as shown with reference numerals 2 and 3 in FIG. 1, are used in the inside of aircraft body 1. FIG. 2, FIG. 3 and FIG. 4 are, respectively, sectional views of the reinforcements, that is, stringers used in the longitudinal direction and stringer frames used in the circumferential direction of the aircraft body 1.

Figure 5:
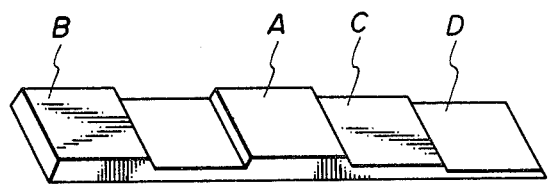
FIG. 5 is a perspective view showing the state of cold working of stringer material.

As shown in the respective figures, FIG. 2 shows a hat-shaped stringer, FIG. 3 a Z-shaped stringer and FIG. 4 a J-shaped stringer. These stringers 2 and 3 are prepared by section roll forming W-material into the hat-, Z- or J-shape and subsequently executing the T6 temper treatment. W-material used in the production of stringers is prepared by stepped cold working of the O-material in the longitudinal direction and solution heat treatment. FIG. 5 is to exemplify a state of the stepped cold working. In FIG. 5, A shows a part which has not been cold worked, and B, C and D show parts cold worked to relatively low degree, intermediate degree and relatively high degree, respectively.

Such stepped cold working is required in order to vary the thickness of each part according to the strength required in each part and to reduce the total weight of the aircraft.

Figure 6:
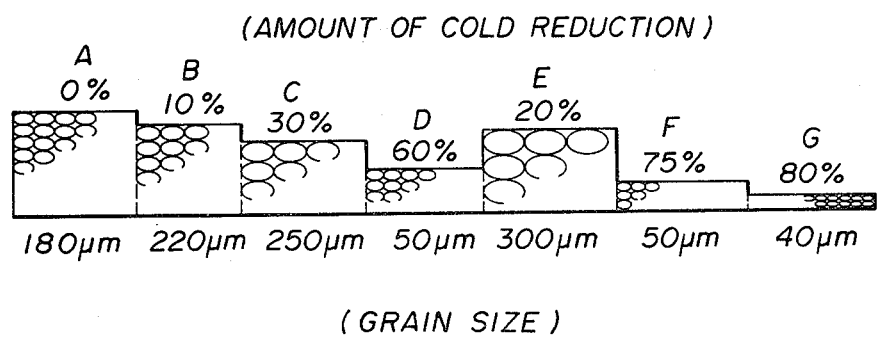
FIG. 6 is an enlarged schematic view illustrating the relationship between cold reduction by cold working and grain size after solution treatment for conventional stringer material.

As mentioned above, the O-material according to the present invention can produce the desired unclad W-material having a fine grain size not exceeding 100 μm and the clad O-material can provide the high corrosion-resistant W-materials having fine core grain size not exceeding 100 μm. However, the O-material prepared according to conventional practice can not produce the clad and unclad W-materials contemplated by the present invention. FIG. 6 illustrates a relationship between the reduction by cold working and grain size after solution heat treatment for the conventional W-material. As can be seen in FIG. 6, in parts D, F and G, cold worked with a large amount of cold reduction, the grain size is small, while in parts A, B, C and E, cold worked with a small amount of cold reduction, the grain size is extremely large.

Figure 7:
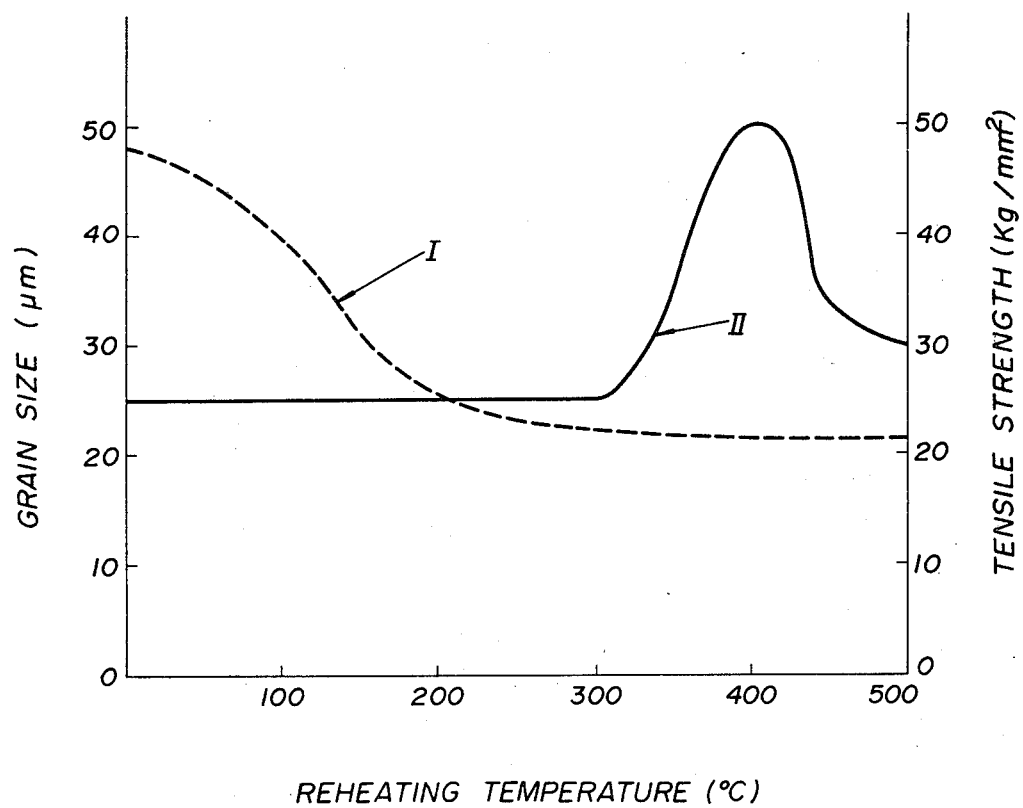
FIG. 7 is a graph showing the relationship between tensile strength of unclad O-material or grain size of unclad W-material and reheating temperature.
Figure 8:
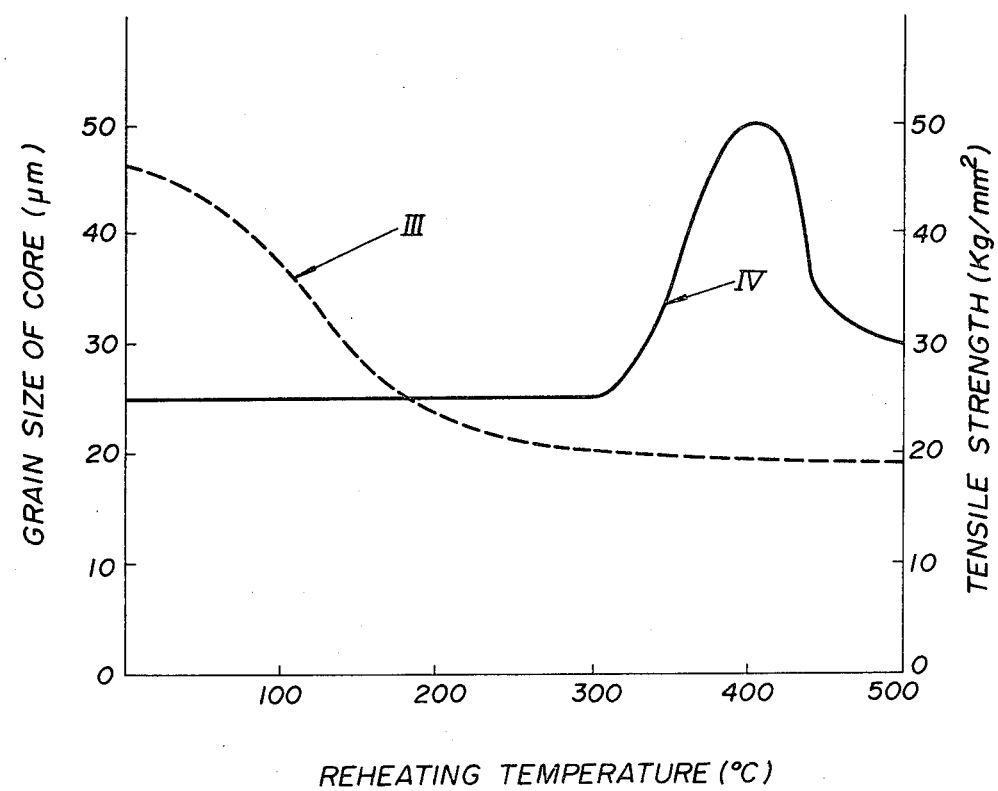
FIG. 8 is a graph showing the relationship between tensile strength of clad O-material or grain size of the core of clad W-material and reheating temperature.

The experiments proved that when the above annealing process is performed by the two-stage thermal treatment, the reheating temperature at the second stage has a significant effect on the tensile strength of the unclad and clad O-materials and grain sizes of the unclad W-material and the core of the clad W-material after receiving stepped cold working and solution heat treatment. This effect is demonstrated in FIGS. 7 and 8, which are graphs plotting the tensile strengths (Curves I and III) of unclad and clad O-materials annealed by rapid heating and subsequently reheating to various temperatures, grain size (Curve II) of unclad W-material and grain size (Curve IV) of the core of clad W-material obtained after cold working the respective O-materials to 20% cold reduction, solution heat treating at 470° C. for 40 minutes and then water quenching against reheating temperature in the annealing process. In this measurement, the first stage of thermal treatment in the annealing process was accomplished by rapid heating, air cooling and holding at room temperature. Thus, this treatment give a hardening effect to the material, increasing the tensile strength of the material thus treated. As can be seen from FIGS. 7 and 8, the increased tensile strength decreased with an increase in reheating temperature. The grain sizes or core grain sizes of W-materials which received the above cold working with a 20% reduction, solution heat treatment and water quenching were dependent on the reheating temperature. A reheating temperature of 200° to 350° C. gave comparatively small grain sizes of 25-35 μm, a reheating temperature of 350° to 440° C. increased considerably the grain sizes to the range of 35 and 50 μm and a reheating temperature of 440° to 500° again decreased grain size to the range of 30-35 μm.

In order to further understand the present invention and the advantages derived therefrom, the following examples are presented. In these example, ingots of the aluminum base alloy having the compositions shown in the following Table 1 were used.

TABLE 1

| Alloy No. | Chemical Composition (wt. %) | | | | | | | | |
|---|---|---|---|---|---|---|---|---|---|
| | Si | Fe | Cu | Mn | Mg | Cr | Zn | Ti | Zr | Al |
| 1 | 0.16 | 0.22 | 1.6 | 0.03 | 2.5 | 0.22 | 5.7 | 0.03 | — | Reminder |
| 2 | 0.09 | 0.18 | 1.7 | 0.01 | 2.4 | 0.24 | 5.8 | 0.04 | — | Reminder |
| 3 | 0.14 | 0.25 | 1.8 | 0.03 | 2.4 | 0.20 | 5.8 | 0.02 | — | Reminder |
| 4 | 0.10 | 0.18 | 1.7 | 0.02 | 2.2 | 0.25 | 7.0 | 0.05 | 0.10 | Reminder |
| 5 | 0.16 | 0.24 | 2.2 | 0.01 | 2.8 | 0.20 | 6.8 | 0.04 | 0.09 | Reminder |
| 6 | 0.11 | 0.19 | 1.8 | 0.01 | 2.4 | 0.21 | 5.9 | 0.04 | — | Reminder |
| 7 | 0.15 | 0.23 | 2.2 | 0.01 | 2.7 | 0.01 | 6.7 | 0.05 | 0.15 | Reminder |
| 8 | 0.11 | 0.22 | 1.0 | 0.02 | 1.5 | 0.19 | 4.5 | 0.03 | — | Reminder |
| 9 | 0.13 | 0.20 | 2.9 | 0.03 | 3.5 | 0.23 | 8.5 | 0.04 | — | Reminder |

Note:
Nos. 1–7: Alloys according to the present invention
Nos. 8–9: Alloys for comparison Example 1

O-materials 3 mm thick having grain sizes not exceeding 100 μm according to the present invention and O-materials 3 mm thick having grain sizes of more than 100 μm according to the conventional method were respectively prepared using ingots, 300 mm in thickness, of alloy Nos. 1 and 4 with the following procedures.

Procedure according to the present invention:
Homogenization treatment (at 460° C. for 16 hours)→Hot rolling (from 300 mm to 6 mm in thickness at 400° C.)→Cold rolling (from 6 mm to 3 mm in thickness)→Annealing (rapid heating to a temperature of 450° C. at a heating rate of 215° C./min. and holding for 3 minutes at the temperature→cooling at a cooling rate of 5° C./min.→reheating at 300° C. for 1 hour→cooling Properties of O-materials and W-materials prepared in Examples 1 and 2 were tested and are given in Table 2.

TABLE 2

| Alloy No. | Grain Size of O-Material (μm) | Cold Reduction (%) | Grain Size of W-Material (μm) | Result of Bending Test*¹ | | Mechanical Properties of T6-Material | | | Fracture Resistance (MN. m⁻³/²) | Surface Roughness after Chemical Milling (μm) | Fatigue Strength after Chemical Milling (Kg/mm²) |
|---|---|---|---|---|---|---|---|---|---|---|---|
| | | | | External Appearance | Occurrence of Crack | Yield Strength (Kg/mm²) | Tensile Strength (Kg/mm²) | Elongation (%) | | | |
| 1*² | 30 | 0 | 30 | Good | None | 51.1 | 57.0 | 16 | 120 | 15 | 18 |
| | | 10 | 35 | " | " | 52.0 | 57.6 | 14 | 120 | 17 | 18 |
| | | 20 | 40 | " | " | 52.6 | 57.3 | 14 | 122 | 20 | 17 |
| | | 30 | 35 | " | " | 51.4 | 57.3 | 14 | 122 | 17 | 18 |
| | | 60 | 30 | " | " | 50.6 | 57.0 | 16 | 122 | 15 | 18 |
| | | 90 | 25 | " | " | 50.7 | 56.9 | 16 | 125 | 12 | 18 |
| 1*³ | 200 | 0 | 200 | Orange peel | Considerable Crack | 50.0 | 56.3 | 10 | 88 | 100 | 7.6 |
| | | 10 | 220 | Orange peel | Considerable Crack | 51.0 | 56.9 | 9 | 80 | 110 | 7.2 |
| | | 20 | 280 | Orange peel | Considerable Crack | 51.2 | 56.7 | 8 | 80 | 140 | 7.0 |
| | | 30 | 190 | Orange peel | Slight Crack | 50.4 | 56.2 | 11 | 87 | 143 | 7.0 |
| | | 60 | 50 | Good | None | 49.7 | 56.5 | 14 | 114 | 25 | 16 |
| 4*² | 25 | 0 | 25 | " | " | 53.1 | 60.0 | 17 | 115 | 12 | 18 |
| | | 10 | 30 | " | " | 54.0 | 60.6 | 15 | 115 | 15 | 18 |
| | | 20 | 35 | " | " | 54.6 | 60.3 | 14 | 117 | 17 | 18 |
| | | 30 | 35 | " | " | 53.4 | 60.3 | 15 | 117 | 17 | 18 |
| | | 60 | 25 | " | " | 52.6 | 60.0 | 16 | 117 | 17 | 18 |
| | | 90 | 25 | " | " | 52.7 | 60.3 | 16 | 120 | 12 | 18.2 |
| 4*³ | 180 | 0 | 190 | Orange peel | Slight Crack | 52.2 | 59.3 | 10 | 84 | 95 | 8 |
| | | 10 | 210 | Orange peel | Considerable Crack | 52.9 | 60.0 | 10 | 79 | 100 | 7.8 |
| | | 20 | 250 | Orange peel | Considerable Crack | 53.2 | 59.7 | 9 | 79 | 126 | 7.4 |
| | | 30 | 180 | Orange peel | Slight Crack | 52.7 | 59.7 | 10 | 82 | 90 | 8.2 |
| | | 60 | 50 | Good | None | 52.0 | 59.5 | 14 | 110 | 25 | 15.6 |

Note:
*¹Bending of 90°, Bending Radius = 1.5t (t = Thickness of Plate)
The test was carried out 4 hours after the water quenching.
*²Present Invention
*³Conventional Method to 200° C. at a cooling rate of 20° C./min.)→O-materials according to the present invention.

Procedure according to the conventional method:

Homogenization treatment (at 460° C. for 16 hours)→Hot rolling (from 300 mm to 6 mm in thickness at 400° C.)→Intermediate annealing (heating at 420° C. for 1 hour→cooling at a rate of 30° C./hr)→Cold rolling (from 6 mm to 3 mm in thickness)→Annealing (heating to 420° C. at a rate of 0.5°–1° C./min. and holding at 420° C. for 2 hours→cooling at a rate of 25° C./hr→heating at 235° C. for 6 hours→air cooling)→O-materials according to the conventional method.

Example 2

Following the procedures described in Example 1, the respective O-materials were further treated to produce W-materials in the following procedures.

Procedure according to the present invention:

→Cold working (cold reduction of 0–90%, as shown in Table 2)→Solution heat treatment (at 470° C. for 40 minutes, using a salt bath)→Water quenching→W-materials according to the present invention.

Procedure according to the conventional method:

→Cold working (cold reduction of 0–90%, as shown in Table 2)→Solution heat treatment (at 470° C. for 40 minutes, using a salt bath)→Water quenching→W-materials according to the conventional method.

In comparing the present invention and the conventional method, it becomes clear from Table 2 that the grain size of the O-material according to the present invention is very fine and can provide a W-material having a fine grain size below 100 μm over a wide range of cold reduction, that is, 0–90%. Such effects eliminated orange peel and the occurrence of cracks during section roll forming and markedly improved the bending properties.

Further, W-materials were subjected to T6 type treatment to produce T6-materials and the mechanical properties were examined. From Table 2, the T6-materials of the present invention proved to be superior to those of the conventional method.

Still further, the respective T6-materials were chemical milled to a 20% reduction in thickness in 10% NaOH aqueous solution and the surface roughness was measured. After chemical milling, a fatigue test was carried out on each T6-material and the result is summarized in Table 2. As can be seen from Table 2, T6-materials according to the present invention are superior to those of the conventional method in surface roughness and fatigue strength, owing to the fine grain size.

EFFECT OF HEATING RATE

Example 3

Ingots 350 mm thick of alloy No. 1 were homogenized at 470° C. for 24 hours, hot rolled between a starting temperature of 440° C. and a final temperature of 340° C. to provide plates 6 mm thick. Subsequently, the hot rolled plates were cold rolled to provide plates 3 mm thick, and received the following annealing treatment to provide O-materials 3 mm thick. Annealing was accomplished by heating to a temperature of 450° C. at the various heating rates shown in Table 3, holding the temperature for three minutes and cooling at a cooling rate of 25° C./hr.

Example 4

The O-materials obtained in Example 3 were further cold worked to various cold reductions shown in Table 3, solution heat treated at 470° C. for 40 minutes using the salt bath and water quenched to provide W-materials.

The relation between grain sizes of O- and W-materials and the heating rate in annealing step is given in the Table 3.

TABLE 3

| Heating Rate to 450° C. (°C./min) | Grain Size of W-Material (μm) Cold Reduction (%) | | | | | Grain Size of O-Material (μm) |
|---|---|---|---|---|---|---|
| | 0 | 10 | 20 | 30 | 60 | |
| 1200 | 30 | 30 | 33 | 30 | 25 | 30 |
| 400 | 30 | 30 | 35 | 30 | 28 | 30 |
| 86 | 30 | 30 | 35 | 35 | 30 | 30 |
| 43 | 30 | 35 | 40 | 40 | 30 | 30 |
| 21 | 35 | 35 | 45 | 40 | 30 | 35 |
| 14 | 75 | 85 | 85 | 75 | 35 | 75 |
| 11* | 110 | 130 | 180 | 160 | 40 | 110 |
| 7* | 120 | 150 | 200 | 170 | 45 | 110 |
| 2.4* | 200 | 230 | 280 | 220 | 45 | 180 |
| 0.9* | 200 | 240 | 300 | 210 | 45 | 180 |

Note:
*Heating rate according to the conventional practice.

As can be seen from Table 3, when heating the rate to 450° C. exceeds 11° C./min., the grain sizes of O-material and W-material are less than 100 μm and fine. On the other hand, when the heating rate is 11° C./min. or less, marked grain growth occurs.

The O-materials which were heated to 450° C. at rates of 86° C./min., 21° C./min., 14° C./min., 11° C./min. and 0.9° C./min. in the annealing step were further tested. The respective O-materials were cold worked to a cold reduction of 0 to 80%, which is practiced in the usual production of aircraft stringers, solution heat treated at 470° C. for 40 minutes using the salt bath and water quenched to produce W-materials.

Following water quenching, the respective W-materials were aged at 120° C. for 24 hours to provide T6-materials. Properties of the W-materials and the T6-materials are given in Table 4. It will be clear from this Table that a heating rate exceeding 11° C./min. is extremely effective in producing desired stringer materials.

TABLE 4

| Average Heating Rate (°C./min) | Cold Reduction (%) | Grain Size of W-Material (μm) | Result of Bending Test of W-Material* | | Mechanical Properties of T6-Material | | |
|---|---|---|---|---|---|---|---|
| | | | External Appearance | Occurrence of Crack | Yield Strength (Kg/mm²) | Tensile Strength (Kg/mm²) | Elongation (%) |
| 86 | 0 | 30 | Good | None | 51.0 | 57.1 | 16 |
| | 10 | 30 | " | " | 52.0 | 57.6 | 13 |
| | 20 | 35 | " | " | 52.4 | 57.9 | 13 |
| | 33 | 35 | " | " | 50.8 | 56.8 | 16 |
| | 50 | 30 | " | " | 50.4 | 57.3 | 16 |
| | 80 | 25 | " | " | 50.2 | 57.7 | 16 |
| 21 | 0 | 35 | " | " | 51.0 | 57.0 | 15 |
| | 10 | 35 | " | " | 52.6 | 57.3 | 12 |
| | 20 | 45 | " | " | 53.0 | 57.0 | 13 |
| | 33 | 40 | " | " | 50.9 | 56.8 | 15 |
| | 50 | 30 | " | " | 49.9 | 57.6 | 17 |
| | 80 | 30 | " | " | 50.3 | 57.3 | 16 |
| 14 | 0 | 75 | " | " | 50.9 | 56.9 | 15 |
| | 10 | 85 | " | " | 52.0 | 57.0 | 13 |
| | 20 | 85 | " | " | 52.5 | 56.9 | 12 |
| | 33 | 75 | " | " | 50.6 | 56.6 | 15 |
| | 50 | 35 | " | " | 50.0 | 57.8 | 16 |
| | 80 | 35 | " | " | 50.1 | 57.4 | 16 |
| 11 | 0 | 110 | Orange peel | Slight Crack | 50.3 | 56.5 | 14 |
| | 10 | 130 | " | " | 51.6 | 56.8 | 13 |
| | 20 | 180 | " | " | 51.5 | 57.0 | 33 |
| | 33 | 160 | " | " | 50.7 | 56.7 | 13 |
| | 50 | 40 | Good | None | 50.3 | 56.5 | 15 |
| | 80 | 40 | " | " | 50.0 | 56.0 | 15 |
| 0.9 | 0 | 200 | Orange peel | Considerable Crack | 50.0 | 56.5 | 10 |
| | 10 | 240 | " | Considerable Crack | 51.1 | 57.0 | 9 |
| | 20 | 300 | " | Considerable Crack | 51.2 | 56.8 | 9 |
| | 33 | 210 | " | Considerable Crack | 50.8 | 56.8 | 10 |
| | 50 | 45 | Good | None | 50.0 | 56.9 | 10 |

TABLE 4-continued

| Average Heating Rate (°C./min) | Cold Reduction (%) | Grain Size of W-Material (μm) | Result of Bending Test of W-Material* | | Mechanical Properties of T6-Material | | |
|---|---|---|---|---|---|---|---|
| | | | External Appearance | Occurrence of Crack | Yield Strength (Kg/mm²) | Tensile Strength (Kg/mm²) | Elongation (%) |
| | 80 | 40 | " | " | 49.8 | 56.0 | 10 |

Note:
*90° Bending, Bending Radius = 1.5 t (t = Thickness of Plate) The Test was carried out 4 hours after water quenching.

EFFECT OF HEATING TEMPERATURE

Example 5

Cold rolled plates 3 mm thick were prepared using ingots of alloy No. 2 in the same procedure as in the case of Example 3. Following cold rolling, the plates were subjected to the following two stage annealing treatment. In the first stage, the plates were heated to various heating temperatures of 320° to 520° C. at various rates, shown in Table 5, held at the temperatures for times shown in the same Table and cooled at a rate of 5° C./min. After the first heating treatment, the plates were reheated at 300° C. for one hour and cooled at a rate of 20° C./hr. providing O-materials 3 mm thick.

Example 6

The O-materials obtained in Example 5 were cold worked to various cold reductions, solution heat treated at 470° C. for 40 minutes using the salt bath and water quenched, providing W-materials.

The relation between the grain sizes of O-materials and W-materials and the first stage heating temperature is given in Table 5. It can be seen from Table 5 that only the O-material which has received annealing treatment characterized by rapid heating to 320° to 500° C. can be converted to W-material having fine grain size even after cold working with a small amount of cold reduction and subsequent solution heat treatment. If the heating temperature is beyond the above range, W-material of fine grain size can not be obtained after cold working with a small amount of cold reduction and solution heat treatment. That is, the grain size of the W-material becomes larger than 100 μm.

TABLE 5

| Average Heating Rate (°C./min) | Heating Temperature (°C.) | Holding Time (min.) | Grain Size of W-Material (μm) Cold Reduction (%) | | | | | Grain Size of O-Material (μm) |
|---|---|---|---|---|---|---|---|---|
| | | | 0 | 10 | 20 | 30 | 60 80 | |
| 230 | 480 | 1 | 30 | 30 | 35 | 35 | 30 25 | 30 |
| 220 | 460 | 3 | 30 | 30 | 35 | 35 | 30 25 | 30 |
| 205 | 430 | 5 | 30 | 35 | 35 | 35 | 30 30 | 30 |
| 198 | 415 | 12 | 35 | 40 | 40 | 40 | 35 30 | 35 |
| 188 | 395 | 10 | 40 | 40 | 45 | 45 | 35 30 | 40 |
| 175 | 370 | 20 | 40 | 45 | 55 | 50 | 35 30 | 40 |
| 150 | 320 | 60 | 40 | 50 | 60 | 60 | 35 35 | 40 |
| 250 | 520* | 2 | 100 | 120 | 150 | 130 | 50 40 | 90 |

Note:
*Eutectic melting occurred.

Three O-materials selected from the O-materials of Example 5 were further examined. The three O-materials were cold worked up to a maximum reduction of 80%, solution heat treated at 470° C. for 40 minutes using the salt bath and water quenched to provide W-materials. The W-materials were further aged at 122° C. for 25 hours to produce T6-materials. Properties of the above W-materials and T6-materials are shown in Table 6. From this table it is apparent that all materials have sufficient properties to be useful as stringer material.

TABLE 6

| Average Heating Rate (°C./min) | Heating Temperature (°C.) | Cold Reduction (%) | Grain Size of W-Material (μm) | Result of Bending Test of W-Material* | | Mechanical Properties of T6-Material | | |
|---|---|---|---|---|---|---|---|---|
| | | | | External Appearance | Occurrence of Crack | Yield Strength (Kg/mm²) | Tensile Strength (Kg/mm²) | Elongation (%) |
| 230 | 480 | 0 | 30 | Good | None | 51.3 | 57.0 | 16 |
| | | 10 | 30 | " | " | 52.3 | 57.8 | 14 |
| | | 20 | 35 | " | " | 52.8 | 56.9 | 14 |
| | | 30 | 35 | " | " | 51.6 | 57.3 | 16 |
| | | 60 | 30 | " | " | 50.3 | 57.0 | 17 |
| | | 80 | 25 | " | " | 50.6 | 57.1 | 17 |
| 205 | 430 | 0 | 30 | " | " | 51.2 | 56.9 | 15 |
| | | 11 | 35 | " | " | 53.0 | 57.3 | 13 |
| | | 20 | 35 | " | " | 52.9 | 57.3 | 14 |
| | | 28 | 33 | " | " | 50.8 | 57.0 | 16 |
| | | 53 | 30 | " | " | 49.8 | 56.9 | 15 |
| | | 75 | 30 | " | " | 50.3 | 57.2 | 15 |
| 188 | 395 | 0 | 40 | " | " | 52.0 | 57.3 | 16 |
| | | 9 | 40 | " | " | 53.1 | 57.9 | 14 |
| | | 22 | 45 | " | " | 52.8 | 57.6 | 13 |
| | | 30 | 45 | " | " | 50.6 | 57.6 | 16 |
| | | 45 | 35 | " | " | 50.1 | 57.0 | 17 |
| | | 80 | 30 | " | " | 50.7 | 57.0 | 17 |

Note:
*90° Bending, Bending Radius = 1.5t (t = Thickness of Plate) The test was carried out 4 hours after water quenching.

EFFECT OF HOLDING TIME AT HEATING TEMPERATURE

Example 7

Cold rolled plates 3 mm thick were prepared from ingots of alloy No. 3 according to the practice described in Example 3. The plates were heated to temperatures of 480° C. to 385° C. at the respective rates shown in Table 7, held at the heating temperature for various times and cooled at a rate of 5° C./min. Following cooling the plates were reheated at 300° C. for one hour and air cooled to produce O-material plates 3 mm thick.

Example 8

The O-materials produced in Example 7 were cold worked to a 20% cold reduction which causes the marked grain growth, solution heat treated at 470° C. for 40 minutes using the salt bath and water quenched to provide W-materials.

The relation between the grain sizes of materials and the rapid heating condition is shown in Table 7.

TABLE 7

| Average Heating Rate (°C./min) | Heating Temperature (°C.) | Holding Time | Grain Size of W-Material (μm) | Grain Size of O-Material (μm) |
|---|---|---|---|---|
| 230 | 480 | 20 sec. | 30 | 30 |
|  |  | 1 min. | 35 | 30 |
|  |  | 5 min. | 35 | 30 |
|  |  | 20 min. | 40 | 35 |
|  |  | 40 min. | 45 | 35 |
| 218 | 455 | 30 sec. | 25 | 25 |
|  |  | 2 min. | 30 | 30 |
|  |  | 10 min. | 35 | 30 |
|  |  | 30 min. | 40 | 35 |
|  |  | 50 min. | 55 | 45 |
| 195 | 410 | 5 min. | 35 | 30 |
|  |  | 10 min. | 35 | 30 |
|  |  | 35 min. | 40 | 35 |
|  |  | 60 min. | 55 | 45 |
| 183 | 385 | 10 min. | 35 | 30 |
|  |  | 25 min. | 45 | 35 |
|  |  | 40 min. | 55 | 45 |
|  |  | 60 min. | 65 | 50 |

In Table 7 it is shown that very fine grain sizes are achieved in both the O- and W-materials over various holding times.

Further, the O-materials in Example 7 were cold worked to a cold reduction of 0 to 90%, solution heat treated at 470° C. for 40 minutes using the salt bath and water quenched. The thus obtained W-materials were less than 100 μm in grain size. A bending test (bending angle 90°, bending radius = 1.5t, t = thickness of plate) was carried out on the W-material 4 hours after water quenching. As a result of the bending test, cracks and orange peels were not observed. The W-materials proved to be excellent as aircraft stringer material.

EFFECT OF PRODUCTION CONDITION

Example 9

O-materials of 2 to 5 mm to thickness were prepared from 400 mm thick ingots of alloy No. 1 shown in Table 1 under the conditions shown in Table 8.

TABLE 8

| No. | Homogenization | Hot Rolling Conditions Init. Temp. (°C.) | Final Temp. (°C.) | Thickness of Plate (mm) | Conditions Intermediate Annealing* | Cold Rolling Cold Reduction (%) | Thickness of Plate (mm) |
|---|---|---|---|---|---|---|---|
| 1 | 470° C. × 24 hr. | 430 | 330 | 6 | not done | 33 | 4 |
| 2 | 470° C. × 24 hr. | 400 | 300 | 6 | 370° C. × 1 hr. | 33 | 4 |
| 3 | 465° C. × 16 hr. | 425 | 310 | 6 | not done | 50 | 3 |
| 4 | 475° C. × 16 hr. | 425 | 310 | 6 | 390° C. × 1 hr. | 50 | 3 |
| 5 | 475° C. × 16 hr. | 425 | 310 | 6 | 400° C. × 1 hr. | 66 | 2 |
| 6 | 475° C. × 16 hr. | 425 | 310 | 6 | 400° C. × 1 hr. | 66 | 2 |
| 7 | 470° C. × 16 hr. | 440 | 280 | 8 | not done | 50 | 4 |
| 8 | 470° C. × 16 hr. | 400 | 260 | 8 | " | 50 | 4 |
| 9 | 470° C. × 16 hr. | 440 | 380 | 5 | " | 40 | 3 |
| 10 | 470° C. × 16 hr. | 440 | 360 | 5 | " | 40 | 3 |
| 11 | 470° C. × 12 hr. | 435 | 325 | 5 | " | 50 | 2.5 |
| 12 | 475° C. × 24 hr. | 415 | 345 | 5 | 350° C. × 1 hr. | 50 | 2.5 |
| 13 | 475° C. × 24 hr. | 415 | 290 | 9 | 400° C. × 1 hr. | 66 | 3 |
| 14 | 475° C. × 24 hr. | 415 | 320 | 8 | 400° C. × 1 hr. | 75 | 2 |
| 15 | 470° C. × 16 hr. | 420 | 320 | 10 | not done | 50 | 5 |
| 16 | 470° C. × 16 hr. | 420 | 335 | 8 | 400° C. × 1 hr. | 63 | 5 |
| 17 | 470° C. × 16 hr. | 420 | 335 | 15 | 400° C. × 1 hr. | 80 | 3 |

| No. | Annealing Rapid Heating Conditions Av. (°C./min) | Heating** | Cooling Rate | Reheating*** |
|---|---|---|---|---|
| 1 | 140 | 450° C. × 1 min. | 5° C./min. | 300° C. × 1 hr. |
| 2 | 21 | 450° C. × 2 min. | 5° C./min. | 300° C. × 1 hr. |
| 3 | 225 | 470° C. × 3 min. | 5° C./min. | 300° C. × 1 hr. |
| 4 | 17 | 480° C. × 30 min. | 5° C./min. | 300° C. × 1 hr. |
| 5 | 450 | 470° C. × 2 min. | 10° C./min. | 470° C. × 1 hr. |
| 6 | 38 | 400° C. × 35 min. | 10° C./min. | 470° C. × 1 hr. |
| 7 | 230 | 480° C. × 1 min. | 10° C./min. | 470° C. × 1 hr. |
| 8 | 24 | 380° C. × 40 min. | 10° C./min. | 470° C. × 1 hr. |
| 9 | 57 | 430° C. × 20 min. | 20° C./hr. | not done |
| 10 | 140 | 455° C. × 2 min. | 20° C./hr. | " |
| 11 | 1300 | 470° C. × 3 min. | 20° C./hr. | " |
| 12 | 38 | 400° C. × 50 min. | 25° C./hr. | " |
| 13 | 900 | 460° C. × 4 min. | 25° C./hr. | " |
| 14 | 440 | 460° C. × 15 min. | 25° C./hr. | " |
| 15 | 680 | 470° C. × 3 min. | 25° C./hr. | " |

TABLE 8-continued

| | | | | |
|---|---|---|---|---|
| 16 | 140 | 440° C. × 10 min. | 25° C./hr. | " |
| 17 | 215 | 450° C. × 2 min. | 30° C./hr. | " |

Note:
*Cooling rate after heating: 25° C./hr.
**First stage heating temperature × Holding time
***Second stage heating temperature × Holding time Cooling rate after reheating is 25° C./hr.

Example 10

O-materials produced under the conditions of Nos. 1 to 17 shown in Table 8 were further cold worked to a 20% cold reduction, solution heat treated at 470° C. for 40 minutes using the salt bath and water quenched to provide W-materials.

Table 9 shows properties of the O-materials and W-materials. The W-materials obtained in Example 10 were aged at 120° C. for 24 hours to provide T6-materials. Properties of T6-materials are given in Table 9.

Comparative O-materials were prepared from ingots of alloy Nos. 8 and 9 400 mm thick according to the procedure described in case of alloy Nos. 3 to 7.

Example 12

The O-materials prepared in Example 11 were cold worked to a cold reduction of 0 to 75%, solution heat treated at 470° C. for 40 minutes using the salt bath and water quenched to produce W-materials. Grain sizes of the thus obtained W-materials are given in Table 10.

TABLE 9

| | Grain Size of O-Material (μm) | Result of Bending Test of W-Material* | | Grain Size of W-Material (μm) | Mechanical Properties of T6-Materials | | |
|---|---|---|---|---|---|---|---|
| No. | | External Appearance | Occurrence of Crack | | Yield Strength (Kg/mm²) | Tensile Strength (Kg/mm²) | Elongation (%) |
| 1 | 35 | Good | None | 40 | 52.5 | 57.9 | 13 |
| 2 | 35 | " | " | 40 | 52.5 | 57.3 | 13 |
| 3 | 35 | " | " | 40 | 52.9 | 57.3 | 13 |
| 4 | 30 | " | " | 35 | 52.9 | 57.3 | 14 |
| 5 | 30 | " | " | 35 | 52.9 | 57.3 | 14 |
| 6 | 35 | " | " | 45 | 51.9 | 56.9 | 14 |
| 7 | 30 | " | " | 30 | 52.3 | 57.8 | 14 |
| 8 | 35 | " | " | 45 | 52.7 | 57.8 | 13 |
| 9 | 35 | " | " | 40 | 51.8 | 57.8 | 13 |
| 10 | 30 | " | " | 35 | 51.8 | 57.8 | 13 |
| 11 | 30 | " | " | 35 | 52.6 | 57.5 | 12 |
| 12 | 40 | " | " | 50 | 52.6 | 57.5 | 13 |
| 13 | 30 | " | " | 35 | 52.6 | 57.4 | 14 |
| 14 | 30 | " | " | 35 | 52.4 | 57.4 | 14 |
| 15 | 30 | " | " | 35 | 52.4 | 57.4 | 13 |
| 16 | 35 | " | " | 40 | 52.8 | 57.4 | 13 |
| 17 | 35 | " | " | 35 | 52.6 | 57.5 | 14 |

Note:
*Bending of 90°, Bending Radius = 1.5 t (t = Thickness of Plate)
The Test was carried out 4 hours after the water quenching.

As can be seen from the above Table 9, all grain sizes of O-materials and W-materials were below 100 μm and grain growth was hardly detected in each material. Further, both the W-materials and T6-materials proved to have excellent properties as aircraft stringer material. In Table 9, the result of the case of 20% cold reduction is given, but also, in the cases of cold reduction of 0 to 80%, grain sizes of less than 100 μm can be developed in the produced W-materials and every material exhibited sufficiently improved properties as aircraft stringer material.

EFFECT OF ALLOY COMPOSITION

Example 11

Ingots of alloy Nos. 3 to 7 400 mm in thickness were homogenized by heating at 470° C. for 25 hours, hot rolled to provide plates 6 mm thick between an initial temperature of 400° C. and a final temperature of 300° C. Following hot rolling, the plates were cold rolled to plates 3 mm thick and annealed by heating to a temperature of 460° C. at an average heating rate of 220° C./min., holding that temperature for five minutes, cooling at a cooling rate of 10° C./min., reheating at 300° C. for one hour and finally air cooling, providing O-materials 3 mm thick.

TABLE 10

| | Grain Size of W-Material (μm) Cold Reduction | | | | | |
|---|---|---|---|---|---|---|
| Alloy No. | 0% | 10% | 20% | 30% | 60% | 75% |
| 3 | 30 | 35 | 40 | 35 | 30 | 30 |
| 4 | 30 | 30 | 35 | 35 | 30 | 30 |
| 5 | 30 | 35 | 35 | 35 | 30 | 30 |
| 6 | 32 | 35 | 35 | 35 | 25 | 30 |
| 7 | 25 | 30 | 35 | 35 | 25 | 30 |
| 8 | 30 | 35 | 40 | 35 | 30 | 30 |
| 9 | 35 | 35 | 40 | 35 | 30 | 30 |

From Table 10 it can be seen that grain sizes of all materials are less than 100 μm over the wide range of cold reductions.

Further, O-materials prepared in Example 11 were cold worked to a 20% cold reduction, solution heat treated at 470° C. for 40 minutes using the salt bath and water quenched to provide W-materials. Properties of the O-materials and W-materials are shown in Table 11 below. In addition to these properties, T6-materials which were produced by aging the W-materials receiving the 20% cold reduction at 120° C. for 24 hours were examined. Properties of the T6-materials also are shown in Table 11.

Upper limits of cold reduction practicable in the cold working process were measured and the results are given in Table 11.

a temperature of 450° C. at a heating rate of 200° C./min. and holding for 3 minutes at this temperature→cooling at a cooling rate of 5° C./min.-

TABLE 11

| Alloy No. | Grain Size of O-Material (μm) | Upper Limit of Cold Reduction (%) | Grain Size of W-Material (μm) | Result of Bending Test of W-Material* | | Stress Corrosion Cracking Life of T6-Material** | Mechanical Properties of T6-Material | | |
|---|---|---|---|---|---|---|---|---|---|
| | | | | External Appearance | Occurence of Crack | | Yield Strength (Kg/mm$^2$) | Tensile Strength (Kg/mm$^2$) | Elongation (%) |
| 3 | 35 | 92 | 40 | Good | None | More than 30 days | 52.3 | 57.1 | 14 |
| 4 | 30 | 90 | 35 | " | " | More than 30 days | 55.3 | 62.4 | 13 |
| 5 | 30 | 90 | 35 | " | " | More than 30 days | 56.7 | 63.8 | 13 |
| 6 | 35 | 92 | 35 | " | " | More than 30 days | 53.1 | 57.9 | 14 |
| 7 | 30 | 90 | 35 | " | " | More than 30 days | 57.9 | 64.0 | 13 |
| 8 | 35 | 95 | 40 | " | " | More than 30 days | 42.3 | 50.4 | 14 |
| 9 | 35 | 55 | 40 | " | " | 9 days | 60.9 | 67.8 | 12 |

Note:
*Bending of 90°, Bending Radius = 1.5 t (t = Thickness of Plate)
The test was carried out 4 hours after water quenching.
**Life to fracture when loading stress of 75% of yield strength to T6-materials in 3.5 NaCl aqueous solution.

From the above Table 11, it will be clear that in case of alloy Nos. 3-7 according to the present invention, very good properties can be attained, but in case of alloys Nos. 8 and 9, such good properties can not be attained. Alloy No. 8 was inferior in strength and alloy No. 9 was apt to exhibit stress corrosion cracking. Both alloys of Nos. 8 and 9 presented problems in applications such as aircraft stringers. Further, referring to the upper limit of cold reduction in the case of a composition according to the present invention, an extremely high degree of cold reduction can be achieved easily, while in the case of a comparative composition of alloy No. 9 such high degree of acid reduction is not practicable.

Further, corrosion-resistant clad O-materials and W-materials were produced in the following examples and their properties were examined.

In the following examples, the alloys listed in the above Table 1 were used as core materials and AA7072 alloy sheet having the following composition was used as cladding material.

The cladding alloy sheet was prepared by homogenizing AA7072 alloy ingot at 530° C. for 24 hours and rolling to the required thickness.

| Cladding Alloy (AA7072 alloy) Chemical Composition (wt. %) | | | | | | | | |
|---|---|---|---|---|---|---|---|---|
| Si | Fe | Cu | Mn | Mg | Cr | Zn | Ti | Al |
| 0.09 | 0.18 | 0.01 | 0.01 | 0.01 | — | 1.1 | — | Reminder |

Example 13

Clad O-materials 3 mm thick according to the present invention and clad O-materials 3 mm thick according to the conventional method were respectively prepared using ingots of alloys Nos. 1 and 4 and the above cladding alloy sheet in the following procedures.

Procedure according to the present invention:

Homogenization treatment of core alloy ingots (at 460° C. for 16 hours)→Hot Clad-rolling (from 300 mm to 6 mm in thickness at 400° C.)→Cold rolling (from 6 mm to 3 mm in thickness)→Annealing (rapid heating to a temperature of 450° C. at a heating rate of 200° C./min. and holding for 3 minutes at this temperature→cooling at a cooling rate of 5° C./min.-→reheating at 300° C. for 1 hour→cooling to 200° C. at a cooling rate of 20° C./min.)→Clad O-materials according to the present invention.

Procedure according to the conventional method:

Homogenization treatment of core alloy ingots (at 460° C. for 16 hours)→Hot clad-rolling (from 300 mm to 6 mm in thickness at 400° C.)→Annealing (heating at 420° C. for 1 hour→cooling at a rate of 30° C./hr)→Cold rolling (from 6 mm to 3 mm in thickness)→Annealing (heating to 420° C. at a rate of 0.5°-1° C./min. and holding at 420° C. for 2 hours→cooling at a rate of 25° C./hr→heating at 235° C. for 6 hours→air cooling)→Clad O-materials according to the conventional method.

The thickness of the cladding in both the present and conventional method is 3% of the total thickness on each side.

Example 14

Following the procedures described in Example 13, the respective clad O-materials were further treated to produce clad W-materials with the following procedures.

Procedure according to the present invention:

→Cold working (to a cold reduction of 0-90%, as shown in Table 12)→Solution heat treatment (at 470° C. for 40 minutes, using a salt bath)→Water quenching→Clad W-materials according to the present invention.

Procedure according to the conventional method:

→Cold working (to a cold reduction of 0-90%, as shown in Table 12)→Solution heat treatment (at 470° C. for 40 minutes, using a salt bath)→Water quenching→W-materials according to the conventional method.

Properties of the O-materials and W-materials prepared in Examples 13 and 14 were tested and are given in Table 12.

In comparing the present invention and the conventional method, it becomes clear from Table 12 that the grain size of O-material according to the present invention is very fine and can provide W-material having a fine grain size below 100 μm over the wide range of cold reduction, that is, 0-90%. Such effects eliminated orange peel and the occurrence of cracks during section roll forming and markedly improved the bending property.

Further, W-materials were subjected to T6 type treatment to produce T6-material and the mechanical properties were examined. From Table 12, T6-materials of the present invention proved to be superior to those of the conventional method.

Still further, the respective T6-materials were chemical milled to a 20% reduction in thickness in 10% NaOH aqueous solution and surface roughness was measured. After chemical milling, fatigue testing was carried out on each T6-material and the result is summarized in Table 12. As can be seen from Table 12, clad T6-materials according to the present invention are superior to those of the conventional method in surface roughness and fatigue strength owing to the fine grain size.

provide clad plates 6 mm thick. Subsequently, the hot clad-rolled plates were cold rolled to provide clad plates 3 mm thick, and received the following annealing treatment to provide clad O-materials 3 mm thick. Annealing was accomplished by heating to a temperature of 450° C. at various heating rates shown in Table 13, holding the temperature for two minutes and cooling at a cooling rate of 25° C./hr. The clad rate of the clad O-material was 2.5% on each side.

Example 16

The clad O-materials obtained in Example 15 were further cold worked to various cold reductions shown in Table 13, solution heat treated at 470° C. for 40 minutes using the salt bath and water quenched to provide W-materials.

The relation between the core grain sizes of O- and W-materials and the heating rate in the annealing step is given in Table 13.

TABLE 12

| Core Alloy No. | Core Grain Size of O-Material ($\mu$m) | Cold Reduction (%) | Core Grain Size of W-Material ($\mu$m) | Result of Bending Test *1 External Appearance | Result of Bending Test *1 Occurrence of Crack | Mechanical Properties of T6-Material Yield Strength (Kg/mm$^2$) | Mechanical Properties of T6-Material Tensile Strength (Kg/mm$^2$) | Mechanical Properties of T6-Material Elongation (%) | Fracture Resistance (MN. m$^{-3/2}$) | Surface Roughness after Chemical Milling ($\mu$m) | Fatigue Strength after Chemical Milling (Kg/mm$^2$) |
|---|---|---|---|---|---|---|---|---|---|---|---|
| 1*2 | 30 | 0 | 30 | Good | None | 49.1 | 55.0 | 15 | 122 | 14 | 18 |
|  |  | 10 | 35 | " | " | 50.0 | 55.6 | 13 | 122 | 16 | 18 |
|  |  | 20 | 40 | " | " | 50.6 | 55.3 | 13 | 124 | 20 | 17 |
|  |  | 30 | 35 | " | " | 49.4 | 55.3 | 13 | 124 | 17 | 18 |
|  |  | 60 | 30 | " | " | 49.6 | 55.5 | 15 | 124 | 15 | 18 |
|  |  | 90 | 25 | " | " | 49.0 | 55.4 | 15 | 127 | 12 | 18 |
| 1*3 | 200 | 0 | 200 | Orange Peel | Considerable Crack | 48.0 | 54.3 | 9 | 88 | 100 | 7.2 |
|  |  | 10 | 220 | Orange Peel | Considerable Crack | 49.0 | 54.9 | 9 | 80 | 100 | 7.6 |
|  |  | 20 | 280 | Orange Peel | Considerable Crack | 49.2 | 54.7 | 8 | 80 | 130 | 7.0 |
|  |  | 30 | 190 | Orange Peel | Slight Crack | 48.4 | 54.2 | 10 | 87 | 90 | 8.4 |
|  |  | 60 | 50 | Good | None | 47.7 | 54.5 | 13 | 114 | 25 | 16 |
| 4*2 | 25 | 0 | 25 | Good | None | 51.1 | 58.0 | 17 | 117 | 12 | 17 |
|  |  | 10 | 30 | Good | " | 52.0 | 58.6 | 15 | 117 | 14 | 17 |
|  |  | 20 | 35 | " | " | 52.6 | 58.3 | 14 | 121 | 18 | 16.3 |
|  |  | 30 | 35 | " | " | 51.4 | 58.3 | 15 | 121 | 18 | 16.1 |
|  |  | 60 | 25 | " | " | 50.6 | 58.0 | 16 | 121 | 12 | 17.4 |
|  |  | 90 | 25 | " | " | 50.7 | 58.3 | 16 | 122 | 12 | 18.1 |
| 4*3 | 180 | 0 | 190 | Orange peel | Slight Crack | 50.2 | 57.3 | 10 | 84 | 93 | 8 |
|  |  | 10 | 210 | Orange peel | Considerable Crack | 50.9 | 58.0 | 9 | 79 | 100 | 8 |
|  |  | 20 | 250 | Orange peel | Considerable Crack | 51.2 | 57.7 | 9 | 79 | 130 | 7.4 |
|  |  | 30 | 180 | Orange peel | Slight Crack | 50.7 | 57.7 | 9 | 82 | 100 | 7.9 |
|  |  | 60 | 50 | Good | None | 50.0 | 57.5 | 13 | 110 | 25 | 15.4 |

Note:
*1 Bending of 90°, Bending Radius = 1.5t (t = Thickness of Plate) The test was conducted 4 hours after the water quenching.
*2 Present Invention
*3 Conventional Method

EFFECT OF HEATING RATE

Example 15

Core ingots 350 mm thick of alloy No. 1 were homogenized at 470° C. for 24 hours, hot clad-rolled with the cladding alloy on both sides between a starting temperature of 420° C. and a final temperature of 340° C. to

TABLE 13

| Heating Rate to 450° C. (°C./min) | Core Grain Size of W-Material (μm) Cold Reduction (%) | | | | | Core Grain Size of O-Material (μm) |
|---|---|---|---|---|---|---|
|  | 0 | 10 | 20 | 33 | 60 |  |
| 1400 | 25 | 25 | 33 | 30 | 25 | 30 |
| 380 | 30 | 30 | 35 | 30 | 28 | 30 |
| 80 | 30 | 30 | 35 | 35 | 30 | 30 |
| 40 | 30 | 35 | 40 | 40 | 30 | 30 |
| 20 | 35 | 35 | 45 | 40 | 30 | 35 |
| 14 | 75 | 85 | 85 | 75 | 35 | 75 |
| 11* | 110 | 130 | 180 | 160 | 40 | 110 |
| 7* | 130 | 150 | 200 | 170 | 45 | 110 |
| 2.2* | 200 | 230 | 280 | 220 | 45 | 180 |
| 0.9* | 200 | 250 | 300 | 220 | 45 | 180 |

Note:
*Heating rate according to the conventional practice.

As can be seen from Table 13, when the heating rate to 450° C. exceeds 11° C./min., the core grain sizes of the O-material and W-material are less than 100 μm and fine. On the contrary, when the heating rate is 11° C./min. or less marked grain growth occurs and the core grain size of the O-and W-materials exceeds 100 μm.

The clad O-materials which were heated to 450° C. at rates of 80° C./min., 20° C./min., 14° C./min., 11° C./min., and 0.9° C./min. in the annealing step were further tested. The respective O-materials were cold worked to a cold reduction of 0 to 80%, which is practiced in the usual production of aircraft stringers and stringer frames solution heat treated at 470° C. for 40 minutes using the salt bath and water quenched to produce clad W-materials.

Following water quenching, the respective W-materials were aged at 120° C. for 24 hours to provide clad T6-materials. Properties of the W-materials and the T6-materials are given in Table 14. It will be clear from this Table that a heating rate exceeding 11° C./min. is extremely effective for producing the desired stringer materials. Also, highly improved corrosion resistance was achieved since these materials were clad with the AA7072 alloy.

TABLE 14

| Average Heating Rate (°C./min) | Cold Reduction (%) | Core Grain Size of W-Material (μm) | Result of Bending Test of W-Material* | | Mechanical Properties of T6-Material | | |
|---|---|---|---|---|---|---|---|
|  |  |  | External Appearance | Occurrence of Crack | Yield Strength (Kg/mm²) | Tensile Strength (Kg/mm²) | Elongation (%) |
| 80 | 0 | 30 | Good | None | 49.0 | 55.1 | 15 |
|  | 10 | 30 | " | " | 50.0 | 55.6 | 12 |
|  | 20 | 35 | " | " | 50.4 | 55.9 | 12 |
|  | 33 | 35 | " | " | 48.8 | 54.8 | 15 |
|  | 50 | 30 | " | " | 48.4 | 55.3 | 15 |
|  | 80 | 25 | " | " | 48.2 | 55.7 | 15 |
| 20 | 0 | 35 | " | " | 49.0 | 55.0 | 14 |
|  | 10 | 35 | " | " | 50.6 | 55.3 | 11 |
|  | 20 | 45 | " | " | 51.0 | 55.0 | 12 |
|  | 33 | 40 | " | " | 48.9 | 54.8 | 14 |
|  | 50 | 30 | " | " | 47.9 | 55.6 | 16 |
|  | 80 | 30 | " | " | 48.3 | 55.3 | 15 |
| 14 | 0 | 75 | " | " | 49.0 | 55.0 | 16 |
|  | 10 | 85 | " | " | 50.2 | 55.1 | 13 |
|  | 20 | 85 | " | " | 50.4 | 54.7 | 12 |
|  | 33 | 75 | " | " | 48.5 | 54.6 | 14 |
|  | 50 | 35 | " | " | 48.3 | 55.6 | 14 |
|  | 80 | 35 | " | " | 48.2 | 55.5 | 15 |
| 11 | 0 | 110 | Orange Peel | Slight Crack | 48.3 | 54.5 | 13 |
|  | 10 | 130 | Orange Peel | Slight Crack | 49.6 | 54.3 | 12 |
|  | 20 | 180 | Orange Peel | Slight Crack | 49.5 | 55.0 | 12 |
|  | 33 | 160 | Orange Peel | Slight Crack | 48.7 | 54.7 | 12 |
|  | 50 | 40 | Good | None | 48.3 | 54.5 | 14 |
|  | 80 | 40 | " | " | 48.0 | 54.0 | 14 |
| 0.9 | 0 | 200 | Orange Peel | Considerable Crack | 48.0 | 54.5 | 10 |
|  | 10 | 250 | Orange Peel | Considerable Crack | 49.1 | 55.0 | 9 |
|  | 20 | 300 | Orange Peel | Considerable Crack | 49.2 | 54.8 | 9 |
|  | 33 | 220 | Orange Peel | Considerable Crack | 48.8 | 54.8 | 9 |
|  | 50 | 45 | Good | None | 48.0 | 54.9 | 9 |
|  | 80 | 40 | " | " | 47.8 | 54.6 | 10 |

Note:
*90° Bending, Bending Radius = 1.5 t (t = Thickness of Plate)
The Test was conducted 4 hours after water quenching.

EFFECT OF HEATING TEMPERATURE

Example 17

Cold rolled plates 3 mm thick were prepared using ingots of alloy No. 2 as cores in the same procedure as in the case of the procedure described in Example 15, except that the core ingots were clad with cladding alloy on one side. Following cold rolling, the plates were subjected to the following two stage annealing treatment. In the first stage, the plates were heated to various heating temperatures of 320° to 520° C. at various heating rates, shown in Table 15, held at the temperatures for times shown in the same Table and cooled at a rate of 5° C./min. After the first heating treatment, the plates were reheated at 300° C. for one hour and cooled at a rate of 20° C./hr., providing one-side clad O-materials 3 mm thick. The clad rate of the product was 2.5%.

Example 18

The O-materials obtained in Example 17 were cold worked to various cold reductions, solution heat treated at 470° C. for 40 minutes using the salt bath and water quenched to provide one-side clad W-materials. W-materials were further aged at 122° C. for 25 hours to produce one-side clad T6-materials. Properties of the above W-materials and T6-materials are shown in Table 16. From this table it is apparent that all the materials have sufficient properties as stringer material.

TABLE 16

| Average Heating Rate (°C./min) | Heating Temperature (°C.) | Cold Reduction (%) | Core Grain Size of W-Material (μm) | Result of Bending Test of W-Material* | | Mechanical Properties of T6-Material | | |
|---|---|---|---|---|---|---|---|---|
| | | | | External Appearance | Occurrence of Crack | Yield Strength (Kg/mm²) | Tensile Strength (Kg/mm²) | Elongation (%) |
| 230 | 475 | 0 | 30 | Good | None | 50.3 | 56.0 | 16 |
| | | 10 | 30 | " | " | 51.3 | 56.8 | 14 |
| | | 20 | 35 | " | " | 51.8 | 55.9 | 14 |
| | | 30 | 25 | " | " | 50.6 | 56.3 | 16 |
| | | 60 | 30 | " | " | 49.3 | 56.0 | 17 |
| | | 80 | 25 | " | " | 49.6 | 56.1 | 17 |
| 210 | 440 | 0 | 30 | " | " | 50.2 | 55.9 | 15 |
| | | 11 | 35 | " | " | 52.0 | 56.3 | 13 |
| | | 20 | 35 | " | " | 51.9 | 56.3 | 14 |
| | | 28 | 33 | " | " | 49.8 | 56.0 | 16 |
| | | 53 | 30 | " | " | 48.8 | 55.9 | 15 |
| | | 75 | 30 | " | " | 49.3 | 56.2 | 15 |
| 190 | 390 | 0 | 40 | " | " | 51.0 | 56.3 | 16 |
| | | 9 | 40 | " | " | 52.1 | 56.9 | 14 |
| | | 22 | 45 | " | " | 51.8 | 56.6 | 13 |
| | | 30 | 45 | " | " | 49.6 | 56.6 | 16 |
| | | 45 | 35 | " | " | 49.1 | 56.0 | 17 |
| | | 80 | 30 | " | " | 49.7 | 56.0 | 17 |

Note:
*90° Bending, Bending Radius = 1.5t (t = Thickness of Plate)
The test was conducted 4 hours after water quenching.

at 470° C. for 40 minutes using the salt bath and water quenched, providing one-side clad W-materials.

The relation between the core grain sizes of the O-materials and W-materials and the first stage heating temperature is given in Table 15. It can be seen from the above Table 15 that only O-material which has received the annealing treatment characterized by rapid heating to 320° to 500° C. can be converted to W-material having fine core grain sizes even after cold working with a small amount of cold reduction and subsequent solution heat treatment. If the heating temperature is beyond the above range, W-material of fine core grain size cannot be obtained after cold working with a small amount of cold reduction and solution heat treatment. That is, the core grain size of W-material becomes larger than 100 μm.

TABLE 15

| Average Heating Rate (°C./min) | Heating Temperature (°C.) | Holding Time (min.) | Core Grain Size of W-Material (μm) Cold Reduction (%) | | | | | | Core Grain Size of O-Material (μm) |
|---|---|---|---|---|---|---|---|---|---|
| | | | 0 | 10 | 20 | 30 | 60 | 80 | |
| 230 | 475 | 1 | 30 | 30 | 35 | 35 | 30 | 25 | 30 |
| 218 | 455 | 3 | 30 | 30 | 35 | 35 | 30 | 25 | 30 |
| 210 | 440 | 6 | 30 | 35 | 35 | 35 | 30 | 30 | 30 |
| 200 | 420 | 12 | 35 | 40 | 40 | 40 | 35 | 30 | 35 |
| 190 | 400 | 10 | 40 | 40 | 45 | 45 | 35 | 30 | 40 |
| 175 | 370 | 18 | 40 | 45 | 55 | 50 | 35 | 30 | 40 |
| 150 | 320 | 55 | 40 | 50 | 60 | 60 | 35 | 35 | 40 |
| 250 | 520* | 2 | 100 | 120 | 150 | 130 | 50 | 40 | 90 |

Note:
*Eutectic melting occurred.

Three materials selected from the one-side clad O-materials of Example 17 were further examined. The three O-material were cold worked up to a maximum reduction of 80%, solution heat treated at 470° C. for 40 minutes using the salt bath and water quenched to provide one-side clad W-materials. W-materials were further aged at 122° C. for 25 hours to produce one-side clad T6-materials. Properties of the above W-materials and T6-materials are shown in Table 16. From this table it is apparent that all the materials have sufficient properties as stringer material.

EFFECT OF HOLDING TIME AT HEATING TEMPERATURE

Example 19

Cold rolled plates 3 mm thick were prepared from ingots of alloy No. 3 according to the practice described in Example 15. The plates were heated to temperatures of 480° C. to 385° C. at the respective heating rates shown in Table 17, held at the heating temperature for various times and cooled at a rate of 5° C./min. Following cooling, the plates were reheated at 300° C. for one hour and air cooled to produce clad O-materials plates 3 mm thick. The clad rate of the O-materials was 2.5% on each side.

Example 20

The O-materials produced in Example 19 were cold worked to a 20% cold reduction, which is apt to cause marked grain growth, solution heat treated at 470° C. for 40 minutes using the salt bath and water quenched to provide clad W-materials.

The relation between the core grain sizes of materials and the rapid heating conditions is shown in Table 17.

TABLE 17

| Average Heating Rate (°C./min) | Heating Temperature (°C.) | Holding Time | Core Grain Size of W-Material (μm) | Core Grain Size of O-Material (μm) |
|---|---|---|---|---|
| 250 | 475 | 20 sec. | 30 | 30 |
| | | 1 min. | 35 | 30 |
| | | 5 min. | 35 | 30 |
| | | 20 min. | 40 | 35 |
| | | 40 min. | 40 | 35 |
| 220 | 455 | 30 sec. | 25 | 25 |

TABLE 17-continued

| Average Heating Rate (°C./min) | Heating Temperature (°C.) | Holding Time | Core Grain Size of W-Material (μm) | Core Grain Size of O-Material (μm) |
|---|---|---|---|---|
| | | 2 min. | 30 | 30 |
| | | 8 min. | 35 | 30 |
| | | 25 min. | 40 | 35 |
| | | 40 min. | 50 | 45 |
| 180 | 415 | 6 min. | 35 | 30 |
| | | 9 min. | 35 | 30 |
| | | 30 min. | 45 | 35 |
| | | 60 min. | 55 | 45 |
| 175 | 390 | 10 min. | 35 | 30 |
| | | 20 min. | 45 | 35 |
| | | 30 min. | 55 | 45 |
| | | 60 min. | 60 | 50 |

From the Table 17 it is shown that very fine core grain sizes are achieved in both the O- and W-materials over various holding times.

Further the O-materials in Example 19 were cold worked to a cold reduction of 0 to 90%, solution heat treated at 470° C. for 40 minutes using the salt bath and water quenched. The thus obtained W-materials were less than 100 μm in core grain size. A bending test (bending angle 90°, bending radius=1.5t, t=thickness of plate) was conducted on the W-material 4 hours after water quenching. As a result of the bending test, cracks and orange peels were not observed. The W-materials proved to be excellent as aircraft stringer material.

EFFECT OF PRODUCTION CONDITION

Example 21

O-materials of 2 to 5 mm in thicknss clad with cladding alloy on both sides were prepared from 400 mm thick core ingots of alloy No. 1 shown in Table 1 under the conditions shown in Table 18. The clad rates all were 2.2% on each side.

TABLE 18

| Core Alloy No. | Homogenization of Core Ingot | Hot Clad-Rollin Conditions | | | Intermediate Annealing* | Cold Rolling Conditions | | Annealing Rapid Heating Conditions | | | |
|---|---|---|---|---|---|---|---|---|---|---|---|
| | | Init. Temp. (°C.) | Final Temp. (°C.) | Thickness of Plate (mm) | | Cold Reduction (%) | Thickness of Plate (mm) | Av. Heating Rate (°C./min) | Heating** | cooling Rate | Re-heating*** |
| 1 | 470° C. × 24 hr. | 425 | 330 | 6 | not done | 33 | 4 | 200 | 450° C. × 1 min. | 5° C./min. | 300° C. × 1 hr. |
| 2 | 470° C. × 24 hr. | 400 | 300 | 6 | 370° C. × 1 hr. | 33 | 4 | 20 | 450° C. × 2 min. | 5° C./min. | 300° C. × 1 hr. |
| 3 | 465° C. × 16 hr. | 425 | 310 | 6 | not done | 50 | 3 | 250 | 470° C. × 3 min. | 5° C./min. | *300° C. × 1 hr. |
| 4 | 475° C. × 16 hr. | 425 | 310 | 6 | 390° C. × 1 hr. | 50 | 3 | 15 | 480° C. × 30 min. | 5° C./min. | *300° C. × 1 hr. |
| 5 | 475° C. × 16 hr. | 425 | 310 | 6 | 400° C. × 1 hr. | 66 | 2 | 500 | 470° C. × 2 min. | 10° C./min. | *470° C. × 1 hr. |
| 6 | 475° C. × 16 hr. | 425 | 310 | 6 | 400° C. × 1 hr. | 66 | 2 | 35 | 400° C. × 35 min. | 10° C./min. | *470° C. × 1 hr. |
| 7 | 470° C. × 16 hr. | 420 | 280 | 8 | not done | 50 | 4 | 230 | 475° C. × 1 min. | 10° C./min. | *470° C. × 1 hr. |
| 8 | 470° C. × 16 hr. | 400 | 260 | 8 | " | 50 | 4 | 24 | 380° C. × 40 min. | 10° C./min. | *470° C. × 1 hr. |
| 9 | 470° C. × 16 hr. | 425 | 380 | 5 | " | 40 | 3 | 57 | 430° C. × 20 min. | 20° C./hr. | not done |
| 10 | 470° C. × 16 hr. | 425 | 315 | 5 | " | 40 | 3 | 140 | 455° C. × 2 min. | 20° C./hr. | " |
| 11 | 470° C. × 12 hr. | 435 | 325 | 5 | " | 50 | 2.5 | 1200 | 470° C. × 3 min. | 20° C./hr. | " |
| 12 | 475° C. × 24 hr. | 415 | 345 | 5 | 350° C. × 1 hr. | 50 | 2.5 | 38 | 405° C. × 50 min. | 24° C./hr. | " |
| 13 | 475° C. × 24 hr. | 415 | 280 | 9 | 400° C. × 1 hr. | 66 | 3 | 800 | 460° C. × 4 min. | 24° C./hr. | " |
| 14 | 475° C. × 24 hr. | 415 | 320 | 8 | 400° C. × 1 hr. | 75 | 2 | 440 | 460° C. × 15 min. | 24° C./hr. | " |
| 15 | 470° C. × 16 hr. | 420 | 320 | 10 | not done | 50 | 5 | 780 | 465° C. × 3 min. | 24° C./hr. | " |
| 16 | 470° C. × 16 hr. | 420 | 320 | 8 | 400° C. × 1 hr. | 63 | 5 | 140 | 440° C. × 10 min. | 24° C./hr. | " |
| 17 | 470° C. × 16 hr. | 420 | 335 | 15 | 400° C. × 1 hr. | 80 | 3 | 215 | 450° C. × 2 min. | 28° C./hr. | " |

Note:
*Cooling rate after heating: 25° C./hr.
**First stage heating temperature × Holding time
***Second stage heating temperature × Holding time

Example 22

Clad O-materials produced under the conditions of Nos. 1 to 17 shown in Table 18 were further cold worked to a 20% cold reduction, solution heat treated at 470° C. for 40 minutes using the salt bath and water quenched to provide clad W-materials.

Table 19 shows properties of the O-materials and W-materials. The W-materials obtained in Example 22 were aged at 120° C. for 24 hours to provide clad T6-materials. Properties of T6-materials are given in Table 19.

TABLE 19

| Core Alloy No. | Core Grain Size of O-Material (μm) | Result of Bending Test of W-Material* External Appearance | Result of Bending Test of W-Material* Occurrence of Crack | Core Grain Size of W-Material (μm) | Mechanical Properties of T6-Materials Yield Strength (Kg/mm²) | Mechanical Properties of T6-Materials Tensile Strength (Kg/mm²) | Mechanical Properties of T6-Materials Elongation (%) |
|---|---|---|---|---|---|---|---|
| 1 | 35 | Good | None | 38 | 50.5 | 56.9 | 12 |
| 2 | 35 | " | " | 38 | 50.5 | 56.0 | 12 |
| 3 | 35 | " | " | 38 | 51.0 | 56.0 | 12 |
| 4 | 30 | " | " | 32 | 51.0 | 56.0 | 13 |
| 5 | 30 | " | " | 33 | 51.0 | 56.0 | 13 |
| 6 | 35 | " | " | 40 | 49.9 | 55.4 | 13 |
| 7 | 30 | " | " | 33 | 50.3 | 56.0 | 13 |
| 8 | 35 | " | " | 45 | 50.7 | 56.0 | 14 |
| 9 | 35 | " | " | 40 | 49.8 | 56.0 | 14 |
| 10 | 30 | " | " | 35 | 49.8 | 56.0 | 14 |
| 11 | 30 | " | " | 35 | 50.6 | 56.0 | 13 |
| 12 | 40 | " | " | 55 | 50.6 | 56.0 | 13 |
| 13 | 30 | " | " | 40 | 50.6 | 56.0 | 13 |
| 14 | 30 | " | " | 40 | 50.4 | 56.0 | 13 |
| 15 | 30 | " | " | 40 | 50.4 | 56.0 | 13 |
| 16 | 35 | " | " | 45 | 50.8 | 56.0 | 13 |
| 17 | 35 | " | " | 35 | 50.4 | 56.6 | 14 |

Note:
*Bending of 90°, Bending Radius = 1.5 t (t = Thickness of Plate)
The Test was conducted 4 hours after the water quenching.

As can be seen from the above Table 19, all core grain sizes of O-materials and W-materials were below 100 μm and grain growth was hardly detected in each material. Further, both the W-materials and T6-materials proved to have excellent properties as aircraft stringer material. In Table 19, the result of the case of a 20% cold reduction is given. However, in the cases of a cold reduction of 0 to 80%, a grain size of less than 100 μm can also be developed in the produced W-materials and every material exhibited sufficiently improved properties as aircraft stringer material.

EFFECT OF ALLOY COMPOSITION

Example 23

Core ingots of alloy Nos. 3 to 7 400 mm in thickness were homogenized by heating at 470° C. for 25 hours and hot clad-rolled with the cladding alloy on one side to provide one-side clad plate 6 mm thick between an initial temperature of 400° C. and a final temperature of 300° C. Following hot clad-rolling, the plates were cold rolled to plates 3 mm thick and annealed by heating to a temperature of 460° C. at an average heating rate of 300° C./min., holding that temperature for five minutes, cooling at a cooling rate of 10° C./min., reheating at 300° C. for one hour and finally air cooling, providing one-side clad O-materials 3 mm thick with a clad rate of 2.6%.

Comparative O-materials were prepared from ingots of alloy Nos. 8 and 9 400 mm thick according to the procedure described in the case of alloy Nos. 3 to 7.

Example 24

The O-materials prepared in Example 23 were cold worked to a cold reduction of 0 to 75%, solution heat treated at 470° C. for 40 minutes using the salt bath and water quenched to produce one-side clad W-materials. Core grain sizes of the thus obtained W-materials are given in Table 20.

TABLE 20

| Core Alloy No. | Core Grain Size of W-Material (μm) Cold Reduction | | | | | |
|---|---|---|---|---|---|---|
| | 0% | 10% | 20% | 33% | 60% | 75% |
| 3 | 30 | 35 | 40 | 35 | 30 | 30 |
| 4 | 30 | 30 | 35 | 35 | 30 | 30 |
| 5 | 30 | 35 | 35 | 35 | 30 | 30 |
| 6 | 32 | 35 | 35 | 35 | 25 | 30 |
| 7 | 25 | 30 | 35 | 35 | 25 | 30 |
| 8 | 30 | 35 | 40 | 35 | 30 | 30 |
| 9 | 35 | 35 | 40 | 35 | 30 | 30 |

From Table 20 it can be seen that core grain sizes of all materials are less than 100 μm over the range of cold reductions.

Further, O-materials prepared in Example 23 were cold worked to a 20% cold reduction, solution heat treated at 470° C. for 40 minutes using the salt bath and water quenched to provide W-materials. Properties of O-materials and W-materials are shown in Table 21 below. In addition to these properties, T6-materials, which were produced by aging the W-materials receiving the 20% cold reduction at 120° C. for 24 hours, were examined. Properties of the T6-materials also are given in Table 21.

Upper limits of cold reduction practicable in a cold working process were measured and the result obtained is given in Table 21.

TABLE 21

| Core Alloy No. | Core Grain Size of O-Material (μm) | Upper Limit of Cold Reduction (%) | Core Grain Size of W-Material (μm) | Result of Bending Test of W-Material* External Appearance | Result of Bending Test of W-Material* Occurence of Crack | Stress Corrosion Cracking Life of T6-Material** | Mechanical Properties of T6-Material Yield Strength (Kg/mm²) | Mechanical Properties of T6-Material Tensile Strength (Kg/mm²) | Mechanical Properties of T6-Material Elongation (%) |
|---|---|---|---|---|---|---|---|---|---|
| 3 | 35 | 92 | 40 | Good | None | more than 30 days | 51.3 | 56.1 | 13 |
| 4 | 30 | 90 | 35 | " | " | more than | 54.3 | 61.0 | 12 |

TABLE 21-continued

| Core Alloy No. | Core Grain Size of O-Material (μm) | Upper Limit of Cold Reduction (%) | Core Grain Size of W-Material (μm) | Result of Bending Test of W-Material* | | Stress Corrosion Cracking Life of T6-Material** | Mechanical Properties of T6-Material | | |
|---|---|---|---|---|---|---|---|---|---|
| | | | | External Appearance | Occurence of Crack | | Yield Strength (Kg/mm²) | Tensile Strength (Kg/mm²) | Elongation (%) |
| 5 | 30 | 90 | 35 | " | " | more than 30 days | 55.7 | 62.8 | 12 |
| 6 | 35 | 92 | 35 | " | " | more than 30 days | 52.1 | 56.9 | 14 |
| 7 | 30 | 90 | 35 | " | " | more than 30 days | 56.9 | 62.5 | 14 |
| 8 | 35 | 95 | 40 | " | " | more than 30 days | 40.3 | 48.3 | 14 |
| 9 | 35 | 55 | 40 | " | " | 9 days | 60.1 | 67.0 | 12 |

Note:
*Bending of 90°, Bending Radius = 1.5 t (t = Thickness of Plate)
The test was carried out 4 hours after water quenching.
**Life to fracture when loading stress of 75% of yield strength to T6-materials in 3.5% NaCl aqueous solution.

From the above Table 21, it will be clear that in the case of alloy Nos. 3–7 according to the present invention, a very good degree of properties can be attained, but in the case of alloy Nos. 8 and 9, such good properties cannot be attained. Alloy No. 8 were inferior in strength and alloy No. 9 was apt to exhibit stress corrosion cracking. Both alloys of Nos. 8 and 9 presented problems in applications such as aircraft stringer and stringer frame. Further, referring to the upper limit of cold reduction, in the case of a composition according to the present invention, an extremely high degree of cold reduction can be achieved easily, while in the case of a comparative composition of alloy No. 9, such high degree of cold reduction is not practicable.

What is claimed is:

1. A method for producing an aluminum alloy product having a grain size not exceeding 100 μm and useful as an aircraft stringer material, comprising the steps of:
   homogenizing an aluminum alloy consisting essentially of 5.1 to 8.1 wt. % zinc, 1.8 to 3.4 wt. % magnesium, 1.2 to 2.6 wt. % copper, at least one of 0.18 to 0.35 wt. % chromium and 0.05 to 0.25 wt. % zirconium, up to 0.20 wt. % titanium, up to 0.50 wt. % iron, up to 0.40 wt. % silicon, up to 0.70 wt. % manganese, and the balance being aluminum and incidental impurities wherein said impurities do not include any of the components named above, thereby to produce an homogenized alloy;
   then hot rolling said homogenized alloy to provide a shaped object;
   then cold rolling said shaped object to provide a plate having a selected thickness;
   then rapidly heating said plate at an average heating rate exceeding 11° C./min. to a temperature of 320° to 500° C. and thereby annealing said plate and effecting recrystallization to form a uniformly fine recrystallized grain structure.

2. A method as claimed in claim 1, including the additional steps of cold working said annealed plate and then subjecting same to solution heat treatment to obtain a plate having a grain size not exceeding 100 μm.

3. The method as claimed in claim 1 or claim 2 in which after said rapid heating step, the annealed plate is cooled at an average cooling rate of less than 30° C./hr.

4. The method as claimed in claim 1 or claim 2 in which after said rapid heating step, the annealed plate is cooled at an average cooling rate of 30° C./hr. or higher, then said plate is reheated to a temperature of 200° to 500° C. and then said plate is cooled at an average cooling rate of 30° C./hr. or less.

5. The method as claimed in claim 1 or claim 2 in which after said rapid heating step, the annealed plate is cooled at an average cooling rate of 30° C./hr. or higher, then said plate is reheated to a temperature of 200° to less than 350° C. and then said plate is air cooled.

6. The method as claimed in claim 2 in which in said cold working step, said annealed plate is cold rolled up to a maximum reduction of 90%.

7. The method as claimed in claim 1 in which said homogenizing step is performed by heating said aluminum alloy at a temperature of 400° to 490° C. for from 2 to 48 hours and said hot rolling step is performed at a starting temperature of 350° to 470° C.

8. The method as claimed in claim 7 in which after said hot rolling step and before said cold rolling step, said shaped object is heated at a temperature of 300° to 460° C. to anneal same and then it is cooled at a cooling rate not exceeding 30° C./hr.

9. The method as claimed in claim 1 or claim 2 in which said aluminum alloy consists essentially of 5.1 to 8.1 wt.% zinc, 1.8 to 3.4 wt.% magnesium, 1.2 to 2.6 wt. % copper, 0.18 to 0.35 wt. % chromium, up to 0.20 wt. % titanium, up to 0.50 wt. % iron, up to 0.40 wt. % silicon, up to 0.70 wt. % manganese, and the balance being aluminum and incidental impurities wherein said impurities do not include any of the components named above.

10. A method for producing a clad aluminum alloy product having a core grain size not exceeding 100 μm and useful as an aircraft stringer material, comprising the steps of:
   homogenizing an aluminum core alloy consisting essentially of 5.1 to 8.1 wt. % zinc, 1.8 to 3.4 wt. % magnesium, 1.2 to 2.6 wt. % copper, at least one of 0.18 to 0.35 wt. % chromium and 0.05 to 0.25 wt. % zirconium, up to 0.20 wt. % titanium, up to 0.50 wt. % iron, up to 0.40 wt. % silicon, up to 0.70 wt. % manganese, and the balance being aluminum and incidental impurities wherein said impurities do not include any of the components named above, thereby to produce an homogenized alloy;
   then hot clad rolling a cladding layer consisting of AA7072 alloy on at least one side of said homogenized core alloy to provide a shaped object;
   then cold rolling said shaped object to provide a plate having a selected thickness;

then rapidly heating said plate at an average heating rate exceeding 11° C./min. to a temperature of 320° to 500° C. and thereby annealing said plate and effecting recrystallization to form a uniformly fine recrystallized grain structure.

11. A method as claimed in claim 10, including the additional steps of cold working said annealed plate and then subjecting same to solution heat treatment to obtain a plate in which the core has a grain size not exceeding 100 μm.

12. The method as claimed in claim 10 or claim 11 in which after said rapid heating step, the annealed plate is cooled at an average cooling rate of less than 30° C./hr.

13. The methd as claimed in claim 10 or claim 11 in which after said rapid heating step, the annealed plate is cooled at an average cooling rate of 30° C./hr. or higher, then said plate is reheated to a temperature of 200° to 500° C. and then said plate is cooled at an average cooling rate of 30° C./hr. or less.

14. The method as claimed in claim 10 or claim 11 in which after said rapid heating step, the annealed plate is cooled at an average cooling rate of 30° C./hr. or higher, then said plate is reheated to a temperature of 200° to less than 350° C. and then said plate is air cooled.

15. The method as claimed in claim 11 in which in said cold working step, said annealed plate is cold rolled up to a maximum reduction of 90%.

16. The method as claimed in claim 10 in which said homogenizing step is performed by heating said aluminum alloy at a temperature of 400° to 490° C. for from 2 to 48 hours, said AA7072 alloy is homogenized at 400° to 560° C. for 2 to 48 hours prior to said hot clad rolling step, and said hot rolling step is performed at a starting temperature of 350° to 470° C.

17. The method as claimed in claim 16 in which after said hot rolling step and before said cold rolling step, said shaped object is heated at a temperature of 300° to 460° C. to anneal same and then it is cooled at a cooling rate not exceeding 30° C./hr.

18. The method as claimed in claim 10 or claim 11 in which said aluminum alloy consists essentially of 5.1 to 8.1 wt. % zinc, 1.8 to 3.4 wt. % magnesium, 1.2 to 2.6 wt. % copper, 0.18 to 0.35 wt. % chromium, up to 0.20 wt. % titanium, up to 0.50 wt. % iron, up to 0.40 wt. % silicon, up to 0.70 wt. % manganese, and the balance being aluminum and incidental impurities wherein said impurities do not include any of the components named above.

19. The method as claimed in claim 1, claim 2 or claim 6, in which after said rapid heating step, the annealed plate is cooled at an average cooling rate of 30° C./hr. or higher.

20. The method as claimed in claim 10, claim 11 or claim 15, in which after said rapid heating step, the annealed plate is cooled at an average cooling rate of 30° C./hr. or higher.

* * * * *